(12) United States Patent
Pelsue et al.

(10) Patent No.: US 7,903,336 B2
(45) Date of Patent: Mar. 8, 2011

(54) OPTICAL METROLOGICAL SCALE AND LASER-BASED MANUFACTURING METHOD THEREFOR

(75) Inventors: Kurt Pelsue, Wayland, MA (US); Stuart A. Dodson, II, Waltham, MA (US); Bradley L. Hunter, Lexington, MA (US); Donald V. Smart, Boston, MA (US); Pierre-Yves Mabboux, Billerica, MA (US); Jonathan S. Ehrmann, Sudbury, MA (US)

(73) Assignee: GSI Group Corporation, Bedford, MA (US)

( * ) Notice: Subject to any disclaimer, the term of this patent is extended or adjusted under 35 U.S.C. 154(b) by 526 days.

(21) Appl. No.: 11/546,024

(22) Filed: Oct. 11, 2006

(65) Prior Publication Data

US 2007/0240325 A1    Oct. 18, 2007

Related U.S. Application Data

(60) Provisional application No. 60/725,363, filed on Oct. 11, 2005, provisional application No. 60/736,354, filed on Nov. 14, 2005.

(51) Int. Cl.
*G02B 27/44* (2006.01)
*G02F 1/295* (2006.01)
*H03M 1/22* (2006.01)
*G01B 11/02* (2006.01)

(52) U.S. Cl. ......... 359/563; 385/10; 341/13; 250/237 G; 356/499; 356/494; 356/521; 33/707

(58) Field of Classification Search .................. 428/209; 216/65; 219/121.68, 121.69, 121.66, 121.73, 219/121.8, 121.85; 101/23; 359/572; 73/490; 33/755, 758; 7/10

See application file for complete search history.

(56) References Cited

U.S. PATENT DOCUMENTS 4,265,534 A * 5/1981 Remijan ..................... 356/2

(Continued)

FOREIGN PATENT DOCUMENTS

DE    19608937    9/1996

(Continued)

OTHER PUBLICATIONS http://www.espimetals.com/tech/inconel625.pdf (ESPI Alloy Composition of Inconel 625).*

(Continued)

*Primary Examiner* — David R Sample
*Assistant Examiner* — Nicole T Gugliotta
(74) *Attorney, Agent, or Firm* — BainwoodHuang

(57) ABSTRACT

A reflective metrological scale has a metal tape substrate and a scale pattern of elongated side-by-side marks surrounded by reflective surface areas of the substrate. Each mark has a furrowed cross section and may have a depth in the range of 0.5 to 2 microns. The central region of each mark may be rippled and darkened to provide an enhanced optical reflection ratio with respect to surrounding surface areas. A manufacturing method includes the repeated steps of (1) creating a scale mark by irradiating the substrate surface at a mark location with overlapped pulses from a laser, each pulse having an energy density of less than about 1 joule per cm2, and (2) changing the relative position of the laser and the substrate by a displacement amount defining a next mark location on the substrate at which a next mark of the scale is to be created.

10 Claims, 21 Drawing Sheets

U.S. PATENT DOCUMENTS

| | | | |
|---|---|---|---|
| 4,406,939 A | | 9/1983 | Golker |
| 4,932,131 A | | 6/1990 | McMurtry et al. |
| 4,972,061 A | * | 11/1990 | Duley et al. ............... 219/121.66 |
| 5,062,021 A | * | 10/1991 | Ranjan et al. .................. 360/135 |
| 5,279,924 A | * | 1/1994 | Sakai et al. .................... 430/290 |
| 5,611,272 A | | 3/1997 | Steuer ............................. 101/23 |
| 5,632,916 A | | 5/1997 | Lappalainen et al. |
| 5,741,381 A | | 4/1998 | Dolence et al. |
| 5,907,144 A | | 5/1999 | Poon et al. |
| 5,959,768 A | * | 9/1999 | Hutton ........................... 359/359 |
| 5,979,238 A | | 11/1999 | Boege et al. |
| 6,285,002 B1 | | 9/2001 | Ngoi et al. |
| 6,472,295 B1 | | 10/2002 | Morris et al. |
| 6,479,787 B1 | | 11/2002 | Jendick ..................... 219/121.68 |
| 6,518,540 B1 | * | 2/2003 | Wee et al. ................. 219/121.61 |
| 6,639,177 B2 | | 10/2003 | Ehrmann et al. |
| 6,777,645 B2 | | 8/2004 | Ehrmann et al. |
| 2003/0161043 A1 | * | 8/2003 | Hoshi et al. ................... 359/566 |
| 2004/0124184 A1 | | 7/2004 | An et al. |
| 2005/0045586 A1 | | 3/2005 | Ellin et al. ....................... 216/65 |
| 2005/0083575 A1 | | 4/2005 | Karam, II |
| 2005/0211680 A1 | | 9/2005 | Li et al. .................... 219/121.68 |

FOREIGN PATENT DOCUMENTS

| | | |
|---|---|---|
| EP | 0 626 228 A1 | 11/1994 |
| JP | 5-169286 | 7/1993 |
| JP | 6-269964 | 9/1994 |
| WO | WO 94/11146 | 5/1994 |
| WO | 03/061891 A2 | 7/2003 |
| WO | 2005/084176 A3 | 9/2005 |

OTHER PUBLICATIONS http://www.assemblymag.com/CDA/Archives/c5f72fdd9c5c9010VgnVCM100000f932a8c0(Jul. 1, 2002 article entitled "The Expanded Reach of Laser Marking").*

JP 06-269964 Machine Translation.*

International Search Report from PCT/US2006/039704, date mailed Apr. 23, 2007.

Bäuerle, Dieter, "Instabilities and Structure Formation," Chapter 28, pp. 571-584, "Laser Processing and Chemistry," Third, Revised and Enlarged Edition With 314 Figures and 13 Tables, Springer, 2000.

ISO/TR 11146-3 Technical Report, First Edition, Feb. 1, 2004, "Lasers and laser-related equipment—Test methods for laser beam widths, divergence angles and beam propagation ratios—Part 3: Intrinsic and geometrical laser beam classification, propagation and details of test methods," Reference No. ISO/TR 11146-3:2004(E), © ISO 2004, Published in Switzerland, 22 pages.

* cited by examiner

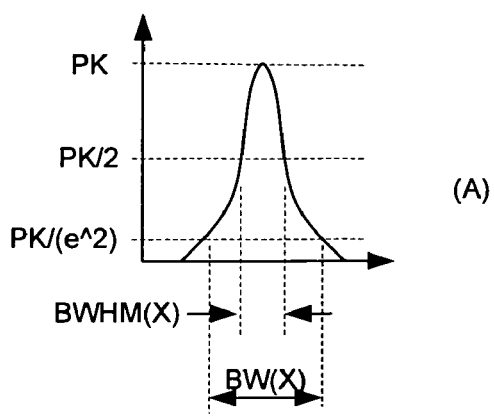
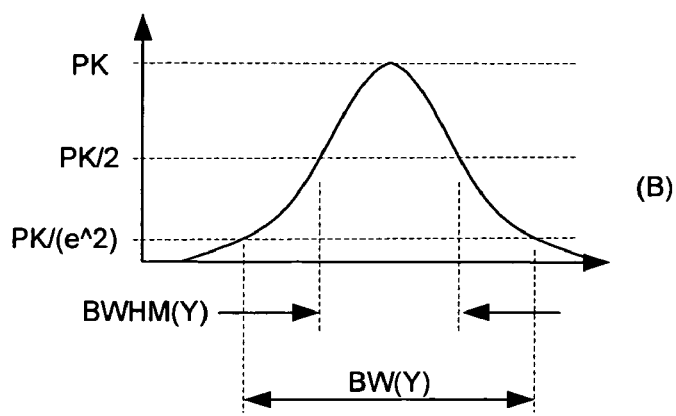
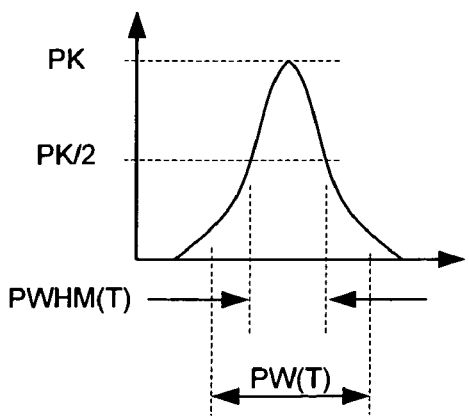
Fig. 6
Fig. 7
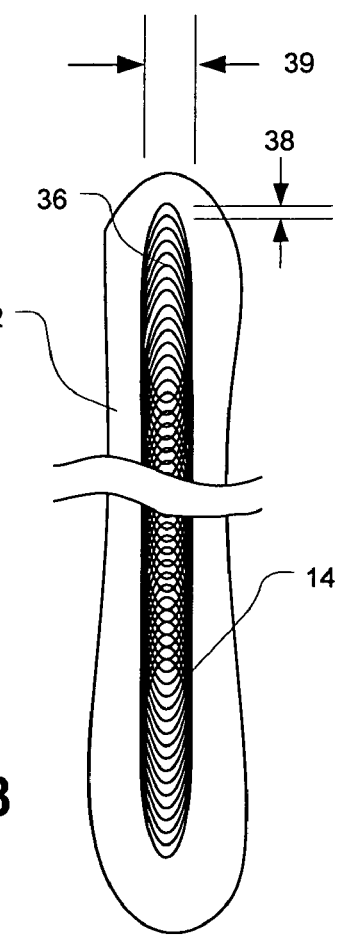
Fig. 8

(A)

(B)

OPTICAL METROLOGICAL SCALE AND LASER-BASED MANUFACTURING METHOD THEREFOR

CROSS REFERENCE TO RELATED APPLICATIONS

This application claims the benefit under 35 U.S.C. §119 (e) of U.S. Provisional application 60/725,363 filed Oct. 11, 2005 and U.S. Provisional application 60/736,354 filed Nov. 14, 2005, the disclosures of which are hereby incorporated by reference.

BACKGROUND

This invention relates to the forming of readable precision structures, a pattern, mark, or other indicia on metrological and like equipment by irradiation with a beam of energy. In particular but not exclusively it relates to the formation of a pattern of marks on an object e.g. graduation structures on a scale to be used for metrological purposes, such as in an optical encoder.

FIG. 11a is a diagram illustrating in detail certain lengthwise topography and pertinent dimensions of an example scale mark;

Optical encoders typically employ scales consisting of a series of spaced-apart marks on a substrate. In the case of a reflective scale, the scale may have reflective marks formed on a non-reflective background, or vice-versa. Transmissive scales may have opaque marks formed on a transparent substrate, or vice-versa. Both reflective and transmissive scales interact with light from an optical source (such as a light-emitting diode (LED) or laser) to create an optical pattern that can be detected by an optical detector. As relative movement between the scale and the detector occurs, the optical pattern changes in a corresponding fashion, and the detector and associated electronic circuitry translate the pattern changes into precise numerical position indications. Scales of the above type, which are known as "amplitude" scales, have been manufactured in a variety of ways, including a commonly used approach of forming the scale marks as metal traces on a glass substrate.

U.S. Pat. No. 5,632,916 discloses a laser method of producing optically readable marks on a metal surface such as a machine part. It is noted that prior marking methods have included (a) engraving on the surface (melting, vaporization) and (b) providing a chemical reaction/change in microstructure by means of a laser (heating), and that the engraving techniques are characterized in that they break the original surface and are situated at a level lower than the original surface. An object of the invention in '916 is to provide a method of producing optically readable marks on a metal surface in such a way that the metal surface is substantially even and has a very good abrasion and corrosion resistance in spite of the marking.

In the laser method disclosed in the '916 patent, a beam of an excimer laser is used to form areas on a chromed metal surface that are discernible as darker areas from the surrounding reflective metal surface. The metal surface is exposed to a laser beam pulse, the energy of which is 1 to 10 $J/cm^2$, preferably 3 to 5 $J/cm^2$ and a duration 5 ns to 1 us, preferably 15 to 30 ns. A spot of impact of the laser beam pulse on the metal surface is changed in such a way that a new spot of impact overlaps previous spots of impact and the metal surface is exposed to a new laser beam pulse, such that an area of the metal surface gets a color contrasting with the original metal surface. The effect of different marking parameters on the darkness (contrast) of a mark and on the surface roughness was studied in a test. In one embodiment, to provide a preferably uniform colored area, the propagation of the edge of successive pulses is 0.1 mm or less. The operating range of the excimer laser, i.e. the repetition frequency range of the pulses, is about 1 to 400 Hz. There is no disclosure in the '916 patent of the spatial distribution the spot/beam intensity at the metal surface.

In one example disclosed in the '916 patent, a hard chrome surface was ground after the chroming in such a way that the value of surface roughness Ra was 0.2 µm or better. The metal surface was moved with respect to the beam in such a way that the propagation of the metal surface between successive pulses was between 0.020 mm and 0.012 mm. The width of the beam on the metal surface was 1 mm and the height in the motion direction varied between 0.2 and 2 mm. In the example shown in the figures, the surface layer consists of a chrome plating on the surface of a steel bar. The thickness of this chrome plating is about 30 µm. The thickness of the marked areas is less than 1 µm, such that the surface is substantially smooth and at the same level as the remainder of the metal surface, which is due to the fact that material is not vaporized from this surface, at least not essentially. It is possible that the laser beam pulse removes a very thin oxide layer from the metal surface. The measured surface roughness values show that the marking method does not impair the surface roughness of the hard chrome surface. The surface roughness is approximately the same measured before marking and after marking at a dark line. The effect of atmosphere was also investigated and found to be negligible.

It is known that there are a number of different mechanisms for pulsed laser processing of materials and that the key factor for determining which mechanism is employed is dependent on the result desired and the base material. For example, metals may be chemically reacted, melted, boiled eruptively, sublimated or molecularly disassociated as a function of power and pulse period. Plastics also can be melted chemically reacted, and molecularly disassociated but boiling eruptions are often preempted by charring. By and large these processes operate to some degree in all solid materials by varied wavelength, power and pulse properties.

With pulses in the low nanosecond range, metal behavior can be as follows. At low pulse energy densities the material may oxidize or react with gases in the atmosphere to change color, and/or it may also re-alloy based on the melting points and solubility of the various constituents or chemically react within its constituent materials. With increased pulse energy density the surface may melt and flow as well as small amounts of plasma may generate and escape. As more material is engaged the materials may begin to violently boil and eject large volumes of material leaving a chaotic craters-and-debris field. If the laser intensity and associated field strength are high enough, as may occur with high intensity ultrashort pulses, a nearly instantaneous transition from the solid to vapor state may occur wherein material removal occurs, avoiding formation of slag or debris.

The invention also relates to methods and systems for precision workpiece processing during motion of a workpiece relative to a tool, and more specifically to processing a workpiece using an energy beam, for instance a pulsed laser beam, to form precision patterns on the workpiece during motion. By way of example, the workpiece may be a flexible substrate, and the processing carried out with a laser beam to produce a flexible metrological tape scale with graduations having optical contrast.

In US Published Patent Application 2005/0045586 (hereafter referred to as '5586) it was disclosed that the production of measurement scale using a laser light to mark its surface has been considered previously. It was noted that In U.S. Pat. No. 4,932,131 an in-situ scale writing or calibration technique is used. A reference is used to lay-down marks or correct any deficiencies in the scale. A laser is used to read and write a scale. In the '5586 it was indicated that the '131 patent does not disclose the method for doing this, and has no mention of overcoming thermal problems.

'5586 also discloses a method of producing precision marks for a metrological scale, employing apparatus including: a scale substrate to be marked at repeated instants by a laser and thereby forming a metrological scale; a laser operable so as to provide light pulses for forming scale markings at the substrate; a displacement device for causing relative displacement between the substrate and the location at which the light is incident on the substrate; and a controller for controlling the relative displacement and the laser, the method comprising the steps, in any suitable order, of: operating the displacement mechanism so as to cause relative displacement between the substrate and the light; using the controller to control the relative displacement and to operate the laser so as to produce light pulses at the substrate; characterized in that: the laser produces a plurality of ultra-short output pulses of a fluence at the substrate such that the metrological scale marks are formed by laser ablation.

The '5586 publication also discloses a laser light manipulation device, a displacement sensor for sensing the displacement between the substrate and the location at which the light is incident and a reader for determining the distance between two or more markings at the scale wherein the method further comprises: issuing a signal from the displacement sensor to the controller; issuing a signal from the reader to controller; in response to the signals from the sensor and the reader using the controller to control the manipulation device, the displacement, and the repeated instants at which the laser ablates the substrate.

FIG. 2 of the '5586 patent shows two pinch rollers 20 and 22 used to feed the ribbon (which has constant tension through the station 100). Pinch roller 20 is driven at an approximately constant rate but no speed governing need be used other than a controllable voltage supply. Pinch roller 22 has two rotary encoder rings 24 affixed thereto or marked thereon. Two readers 26 read the encoder markings to provide a machine controller (200 FIG. 1) with two signals so an average of the two can be used to provide a ribbon displacement value to the controller. This averaged ribbon displacement signal at the machine controller 200 is used, via software, to govern the firing of ribbon marking laser 21.

Additionally, '5586 discloses a system of two or more scale readers, in this instance two readers 23a and 23b, are used to read the scale that is being produced by the laser 21. The readers 23 are set at a pre-determined distance L apart and so any errors in the pitch of the markings can be determined and adjustment via software of the laser firing rate can be made if appropriate. So even if the temperature at the laser irradiated area increases slightly, the temperature at the readers will remain constant and then any slight heating by the laser light can be compensated for by increasing the scale pitch at the laser irradiated area.

Japanese Patent 5169286 (based on certified translation received), also cited in '5586, shows a method of obtaining a marking perpendicular to the direction of travel of a measurement scale which is being marked using a laser. As shown in the drawing, the system includes: a laser oscillator, a deflecting mirror, an f-θ lens, an actuator, a moving device, a moving table, a motor, encoder, scale member, first controller, second controller. Included is a device for marking a scale line by irradiating the front surface of a member to be scaled that is carried in the scale direction at a constant speed with a laser beam swept by a scanner, that is equipped with a controller that operates the scanner such that the location that is irradiated by the laser beam moves in a direction forming angle θ with the direction of the carrying speed V of the member at a speed of V/cos θ. The system is equipped with a controller that operates the scanner such that the location that is irradiated by the laser beam moves in a direction forming angle θ with the direction of the carrying speed V of the member at a speed of V/cos θ, starts the laser beam irradiation at a point in time corresponding to the starting position of the scale line to be marked, and finishes this laser beam irradiation after an amount of time corresponding to the length of the scale line has elapsed. The starting point of the laser beam irradiation corresponds to a position signal that is output when the member to be scaled reaches a prescribed position. The location that is irradiated by the laser beam moves in a direction forming angle θ with the direction of the carrying speed V of the member to be scaled at a speed of V/cos θ, so scale lines are marked on the member to be scaled in a direction orthogonal to the scale direction, the direction in which the laser beam is swept by deflecting mirror is not orthogonal to the scale direction, but instead forms a prescribed angle as described later, and that a second controller is used in place of the first controller. Moreover, this embodiment differs operationally from the example of prior art in that: scale plate 9 is successively carried at a constant speed; a prescribed relationship is established between the carrying speed of the scale plate, the speed at which deflecting mirror is swept, and the sweeping direction; and the manner in which the timing of the laser beam emission is determined is predefined.

U.S. Pat. No. 5,741,381 describes a labeling system and method. FIGS. 8 and 10 show a radius sensor that provides radius data to a processor to translate rotational speed of a motor drive and a radius of a roll into a linear feed rate. An alternative optical sensor reads registration indicia.

SUMMARY

An optical metrological scale and a laser-based method of manufacturing such a scale are disclosed. In particular, the inventors have found parameters and apparatus for the use of a nanosecond pulse laser in a non-chaotic process regime for producing graduations on a precision metrological scale free from thermal deformations and of high definition and contrast (i.e., having local tolerances less than about one µm).

In one aspect, the disclosed metrological scale is a flexible metrological tape scale, the tape scale including a metal. The scale includes first and second surface regions having optical contrast. The dimensional variation along an edge that separates the first and second regions is substantially less than the width of the structure. A surface profile of the structure may include protruding material portions extending above the average height of the surface portion surrounding the structure and indented material portions below the average height of the surrounding surface portion. The area of the protruding and indented material portions may be approximately equal wherein, during formation of the structure, material is displaced as a result of melting and wherein substantial material ejection away from the structure is avoided. Therefore, displacement of substrate material results in optical contrast, but the quantity of displaced material is not so large to cause formation of a poorly formed, chaotic structure that impairs readability of the metrological scale. By way of example, one scale includes structures having 20 µm pitch that are characterized by first and second surface regions having optical contrast, the relative depth of the first and second surface regions being less than about 1.5 µm, and having variation at an edge between the first and second regions no greater than about 1 µm along the length of the structure. Larger or smaller pitch structures may have proportional structural dimensions such as 10 µm pitch being shallower and 40 µm pitch being deeper.

More particularly, the metrological scale is a reflective scale comprising a metal substrate having a scale pattern formed on a reflective surface thereof, wherein the scale pattern includes a plurality of elongated side-by-side marks surrounded by reflective surface areas of the substrate. In one embodiment, each mark has a generally furrowed cross section with a central region below a mean height of the surface of the substrate and two outer ridge regions above the mean height of the surface of the substrate, wherein the central and outer ridge regions define a mark depth in the range of about 0.5 µm to about 2 µm.

Additionally, the metrological scale may include microstructures that are formed by a laser-material thermal interaction, and further having a dependence on at least one of the laser wavelength and laser polarization. The central region of each mark may be rippled with a ripple height less than about 20% of the mark depth. The metrological scale may include structures having a darkened color that are formed as a result of at least one of a thermal and chemical interaction, and provide an optical reflection ratio with respect to the surrounding reflective surface areas of the substrate of about 1:4 or less (e.g., 1:6). The scale may be formed on a substrate of a nickel-based metal alloy such as known by the trade names Invar® or Inconel®, and may be in the form of a thin and elongated flexible tape.

In another aspect, a high speed method is disclosed for producing well formed structures on a substrate. The method includes irradiating the substrate with a series of laser pulses at a high repetition rate. The series of pulses impinge the substrate over a related series of spatially overlapping spots, each spot having an intensity distribution, and the series of impinging pulses transport sufficient energy to modify a portion of the substrate and alter the directional reflectance of the substrate, whereby optical contrast is obtained between the marks and the surrounding substrate portions. The energy is also outside a range that causes formation of a poorly formed, disorganized structure. The transported energy may be sufficiently high to cause melting of the metal while sufficiently low to avoid heating the metal to a temperature that causes boiling of the metal. The temporal spacing between at least some consecutive pulses of the series may correspond to a pulse repetition rate of at least 20 kHz.

The change in reflectance may include a color change within the modified surface portion, and may be caused by a chemical reaction. When viewed using bright field illumination, a color of a section within the modified portion may be substantially uniform along a first direction, and substantially smoothly varying along a second direction substantially perpendicular to the first direction. At least one of the modified and non-modified regions may include a narrow transition region wherein a rapid change in reflectance is detectable, and a dimensional variation of the transition region may be substantially less than the width of the modified surface portion along at least a portion of the transition region.

The processed area may be viewed using bright field illumination, and the optical contrast between the modified and unmodified portions may be measured at (Imax−Imin)/(Imax+Imin) and may be at least 10:1. The range of acceptable laser irradiance (Watt/cm$^2$) can vary widely, by more than 4:1 for example, and yield acceptable results as long as the pulse fluence is well controlled. Pulse width can also vary widely, also in excess of 4:1 for example. The scale of the structure is strongly influenced by the number of overlapping pulses used in processing an area and the pulse properties of irradiance, duration and fluence.

It has been determined that for a short-pulsed laser beam, the energy density for producing a well formed structure is approximately at the threshold of melting in a single pulse. Further, by rapidly overlapping many pulses, relatively large structures can be created without initiating chaotic processes. An amount of energy that smoothly melts and forms a thin film of melt metal with each pulse that flows under the laser is preferred, to avoid creating a chaotic distribution of the metal or, worse, creating boiling. Specific examples of desired processing parameters are shown herein.

It has also been observed that as the fluence is increased above the threshold value of melting the metal substrate, microstructures on the order of the laser wavelength and oriented relative to the laser's polarization are formed by multiple successive overlapping pulses, with a change in surface color through chemical reaction. Increasing the energy density further recasts the microstructures on the smooth furrow structure. At even greater energy density, only a smooth furrow structure is generated. It has also been determined that the spatial distribution of the spot intensity can be an important characteristic of the method.

The manufacturing method includes the repeated steps of (1) creating a mark of a scale by irradiating a surface of the reflective metal substrate at a predetermined mark location with a series of overlapped pulses from a laser. Each light pulse has an energy density of less than about 1 joule per centimeter-squared over a spot area bounded by the $1/e^2$ diameter, and (2) changing the relative position of the laser and the substrate by displacement that defines a next mark location on the substrate at which a next mark of the scale is to be created. In the case of a linear scale, the marks are substantially parallel in a direction generally orthogonal to a long axis of the scale. The metal substrate may be a nickel-based metal alloy such as known by the trade names Invar® or Inconel®, and may be sufficiently thin and elongated to take the form of a flexible tape. The method may also be used to manufacture rotary scales having radially extending marks.

In at least one embodiment a structure is created by irradiating the substrate with laser pulses, each pulse having: pulse width (measured at half maximum) in the range of about 10-40 nanoseconds, a spot distribution (measured over the $1/e^2$ diameter) with energy density in the range of about 0.1-1 J/cm$^2$, and at least some pulses spatially overlapping about 10-50 times, the pulses being generated at a rate of about 100 kHz or greater. In at least one embodiment a furrowed structure is produced that results in optical contrast at least 4:1. The laser pulses may employ non-circular polarization oriented at about 0 degrees or about 90 degrees to the length of the structure.

Well known tape transport systems frequently employ pinch rollers and various methods to mechanically control tension in the tape. These approaches are well suited to lower accuracy tape transport applications where minute variations in roller radii, ball-bearing signatures and mechanical friction with guide rollers create errors too small to be of concern to the application. However, for production of a precision metrological scale, a precision ruling engine application, there is a demand for a higher level of precision that can only be obtained by eliminating any significant source of mechanical friction during the writing process. For example, a desirable specification is to obtain 10 microns/meter (10 µm/m) or better absolute pitch accuracy of an entire reel of flexible metal tape, which may typically be 30 meters or more in length. Further, when writing the tape, the precision should be maintained for both short and long term durations. These and other considerations are particularly relevant in the design of a high-speed system for irradiating a substrate to produce such a precision metrological flexible tape scale.

In one general aspect a system and method for processing a workpiece having a flexible substrate is disclosed. The system includes a tool that is controlled to cause an interaction with the substrate material to affect the material, and a rotary write spindle supported on an air bearing for positioning the flexible substrate relative to the tool. In at least one embodiment the tool includes a pulsed laser that impinges a substrate material and modifies a physical property of the substrate.

In one aspect, the disclosed workpiece is a flexible metrological tape scale, which may be made of metal at least in part. The scale includes first and second surface regions having optical contrast. The dimensional variation along an edge that separates the first and second regions is substantially less than the width of the structure. A surface profile of the structure may include protruding material portions extending above the average height of the surface portion surrounding the structure and indented material portions below the average height of the surrounding surface portion. The area of the protruding and indented material portions may be approximately equal wherein, during formation of the structure, material is displaced as a result of melting and wherein substantial material ejection away from the structure is avoided. Therefore, displacement of substrate material results in optical contrast, but the quantity of displaced material is not so large to cause formation of a poorly formed, chaotic structure that impairs readability of the metrological scale. By way of example, one scale includes structures having 20 µm pitch that are characterized by first and second surface regions having optical contrast, the relative depth of the first and second surface regions being less than about 1.5 µm, and having variation at an edge between the first and second regions no greater than about 1 µm along the length of the structure. Larger or smaller pitch structures may have proportional structural dimensions such as 10 µm pitch being shallower and 40 µm pitch being deeper.

More particularly, the metrological scale may be a reflective scale comprising a metal substrate having a scale pattern formed on a reflective surface thereof, wherein the scale pattern includes a plurality of elongated side-by-side marks surrounded by reflective surface areas of the substrate. In one embodiment, each mark has a generally furrowed cross section with a central region below a mean height of the surface of the substrate and two outer ridge regions above the mean height of the surface of the substrate, wherein the central and outer ridge regions define a mark depth in the range of about 0.5 µm to about 2 µm.

A metrological scale made with the above method, and a system for carrying out the method are disclosed. In one embodiment, the metrological scale may be a reflective diffraction grating.

In one aspect a system for producing a metrological scale on a flexible metal substrate is disclosed. The system includes a controllable source of energy for modifying the substrate material to thereby form scale graduation; a rotary write spindle supported on an air bearing for positioning the substrate relative to a location where energy emitted from the source impinges the substrate; and at least one controller coupled to the spindle and the source for coordinating delivery of radiant energy to the substrate.

At least one embodiment includes a system for producing a metrological tape scale on a flexible substrate. The system includes: a pulsed laser source, a beam delivery system that accepts source energy and delivers energy to the flexible substrate, a precision write spindle between an input spindle and an output spindle, each of the spindles supported on respective air bearings, each spindle also supporting at least a portion of the substrate; one or more probes for monitoring at least one parameter that relates to a position at which the energy beam impinges the substrate; and at least one controller that coordinates motion of the substrate with delivery of the laser energy to the substrate based on at least information obtained from the one or more probes.

In at least one embodiment, the rotary write spindle causes relative displacement between the substrate and the location at which the energy is incident on the substrate; the spindle remaining fixed (relative to the substrate) and in intimate thermal and mechanical contact with the substrate long before and after the delivery of energy to the substrate, so as to dissipate heat from the substrate. The system may further include a substantial drum on the spindle to fixture the substrate and dissipate the excess process heat.

The system may also include an input reel that supports the flexible substrate, and a feed spindle coupled the input reel that rotatably supports the input reel and substrate, the input spindle supported on an air bearing and being operable to transport a portion of the flexible substrate to the write spindle.

The system may also include an output reel that supports the flexible substrate, an output spindle coupled to the output reel, the output spindle being supported on an air bearing and operable to accept a portion of the flexible substrate subsequent to delivery of the energy to the substrate At least one respective spindle encoder coupled to each spindle produces a signal related to the motion of the spindle for controlling the motion of the spindle with the at least one controller.

The at least one controller may provide a control signal in response to sensed information from the write spindle, for instance spindle position, velocity, acceleration, or torque information related to at least the write spindle.

The system may include a non-contact radius measurement probe for measuring a surface of the write spindle to detect at least a deviation in the radius of the write spindle, and also for detecting a deviation that includes a radius of the write spindle and a thickness of a portion of the substrate supported on a spindle, and for providing a signal related to the at least one radius.

The radius measurement probe may include first and second capacitance sensors coupled by a member having a substantially low coefficient of thermal expansion, for instance INVAR™, the first sensor for sensing a surface near the center of the spindle, the second sensor for sensing a surface from which the radius of the spindle, and tape supported by the spindle, is measurable, wherein the signals from the first and second probes provide for a high stability, differential radius measurement.

The radius probe may sense a surface during a time interval prior to irradiating the portion and also during a time interval when the portion is being positioned with the write spindle.

A control signal may be derived from a signal provided by the radius measurement probe to compensate both short term and long term variations that may relate to a position of the energy beam that impinges the substrate.

In at least one embodiment the at least one probe may include a temperature probe, radius sensor, a plurality of optical encoders, or a single optical encoder.

In at least one embodiment each spindle may be operatively connected to a respective spindle controller, wherein each controller operates in a velocity control mode, and produces an output representative of a velocity of the spindle, and also produces and an output representative of the torque of a drive motor that drives the spindle.

At least one embodiment may include a means for estimating a combined radius of the write spindle and tape supported by the write spindle, and a tension control means operatively connected to the means for estimating for controlling the tension of the substrate during motion of the substrate.

At least one embodiment includes a system for producing a metrological tape scale on a flexible substrate. The system includes: a pulsed laser source, a beam delivery system that accepts source energy and delivers energy to the flexible substrate; a precision write spindle between an input spindle and an output spindle, each of the spindles supported on respective air bearings, each spindle also supporting at least a portion of the substrate; a non-contact radius measurement probe for monitoring a spindle radius that relates to a position at which the energy beam impinges the substrate; and at least one controller that coordinates motion of the substrate with delivery of the laser energy to the substrate based on at least information obtained from the one or more probes. The metrological scale is created by irradiating the flexible substrate with laser pulses, each pulse having: pulse width (measured at half maximum) in the range of about 10-40 nanoseconds, a spot distribution (measured over the $1/e^2$ diameter) with energy density in the range of about 0.1-1 $J/cm^2$, and at least some pulses spatially overlapping about 10-50 times, the pulses being generated at a rate of about 100 kHz or greater. In at least one embodiment a furrowed structure is produced that results in optical contrast at least 4:1. The laser pulses may employ non-circular polarization oriented at about 0 degrees or about 90 degrees to the length of the structure. The non-contact radius measurement probe is used to measure a surface of the write spindle to detect at least a deviation in the radius of the write spindle, and also to detect a deviation that includes a radius of the write spindle and a thickness of a portion of the substrate supported on a spindle, and for providing a signal related to the at least one radius. The radius measurement probe includes first and second capacitance sensors coupled by a member having a substantially low coefficient of thermal expansion, for instance INVAR™, the first sensor for sensing a surface near the center of the spindle, the second sensor for sensing a surface from which the radius of the spindle, and tape supported by the spindle, is measurable, wherein the signals from the first and second probes provide for a high stability, differential radius measurement. The resulting metrological scale has a pitch of 10-50 µm nominal, with a pitch accuracy of about 10 µm/meter or better and sufficient optical contrast sufficient for use with optical encoders.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

FIG. 6 (consisting of FIGS. 6(A) and 6(B)) is a diagram showing X-direction and Y-direction intensity profiles of the laser beam spot portion of FIG. 5;

FIG. 7 is a diagram illustrating an approximate temporal distribution of intensity of the laser beam spot of FIG. 5;

FIG. 8 is a diagram depicting a scale mark made by the method of FIG. 3;

DETAILED DESCRIPTION

The disclosure of U.S. provisional application 60/736,354 filed Nov. 14, 2005 and entitled "System And Method For Manufacturing Flexible-Tape Metrological Scales" is incorporated by reference herein.

The following description uses certain terms for which a brief description, intended to clarify and to be non-limiting, is presented. The description makes reference to "chaotic" structures, where "chaotic" generally refers to an observable structure that can be characterized as a disorganized or confusing mass or mixture of materials formed at a location of laser impingement. By way of example, such chaotic structure may be a collection of molten material having an irregular shape and varying reflectivity. A "non-chaotic" or "well-formed" structure may, by way of example, be a region having a smooth measurable spatial profile, or a quasi-periodic spatial profile, with regular regions of homogeneous color along a given direction. A "furrow" or "furrowed" structure has the form of relatively long and narrow shallow depression from a surrounding surface, in some cases exhibiting either a U-shaped or V-shaped cross section. "Energy density" and "fluence" are synonymous terms referring to the energy per unit area that impinges a target location, which is calculated in a manner described below. Unless otherwise specified, the energy density and spot diameter used in the calculation correspond to the $1/e^2$ (13.5% of peak intensity) diameter of a spot (or beam) intensity distribution, which may be an elliptical Gaussian, for example. A pulse "repetition rate" or "repetition frequency" refers to the number of pulses per second, typically in Hz. For example, 10 kHz is 10,000 pulses per second. A corresponding temporal pulse spacing is the reciprocal of the pulse repetition rate and generally refers to the temporal spacing between two consecutive pulses (i.e., may be regarded as the reciprocal of an "instantaneous" repetition rate). Reference is also made to an "edge" that separates surface regions having optical contrast. An edge is defined by a line or narrow region at which a rapid change in reflectance occurs. For example, the edge may be found at a location where a measurable change in reflectance corresponds to a maximum.

Figure 1:
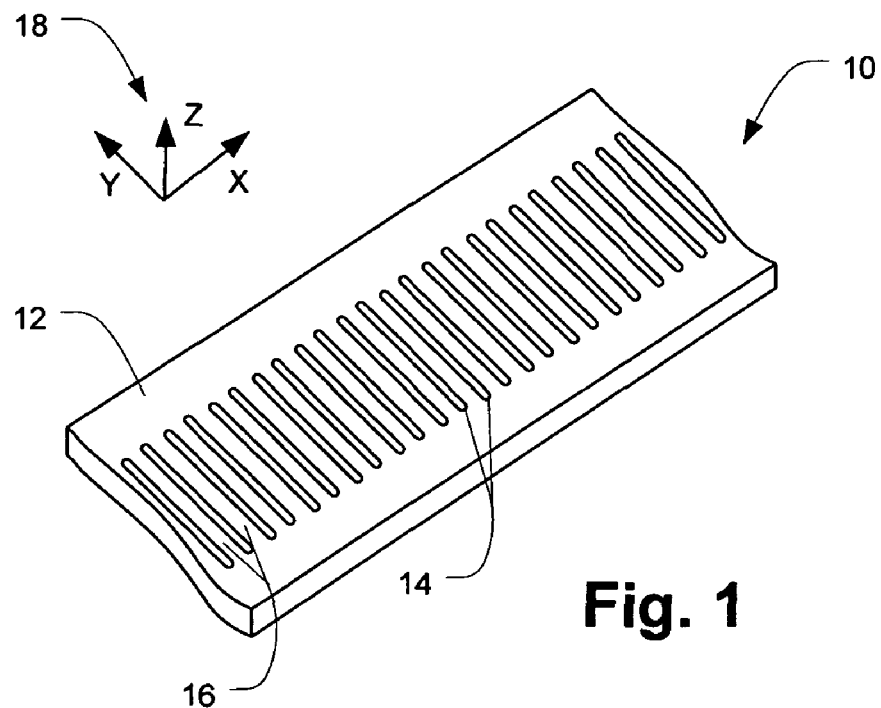
FIG. 1 is a schematic perspective view of a portion of an optical metrological scale in accordance with an embodiment of the present invention.

Turning now to FIG. 1, a linear metrological scale 10 includes a metallic substrate 12 on which a plurality of elongated linear scale marks 14 have been formed. The substrate 12 is a nickel alloy such as known by the trade names Invar® and Inconel®. In one embodiment, the substrate 12 may be a flexible tape or portion thereof, whereas in alternative embodiments the substrate 12 may be substantially rigid. The scale marks 14 generally include shallow surface indentations formed using a laser-based method as described below. In some embodiments the marks 14 include "microstructure" of indentations and protrusions, which may appear as ridges or rippled surface portions. In certain embodiments rippled surface portions may be produced that have a nearly-periodic surface roughness profile along a direction, for example along the length or width of a structure of the scale. The scale marks 14 are formed to provide a desired high optical contrast with the interdigitated non-processed surface areas 16 of the substrate 12. This contrast is achieved in part by altering the directional reflectivity due to the contour of the scale marks 14, and in part by inducing a color change of the surface of the scale marks 14 as a result of the laser processing, as described in more detail below.

Also shown in FIG. 1 is a set of coordinate axes 18 for convenient indication of directions on the scale 10 in the description below. The Y direction extends parallel to the scale marks 14; the X direction extends across the scale 10 orthogonal to the scale marks 14; and the Z direction extends from the surface of the substrate 12.

Figure 2:
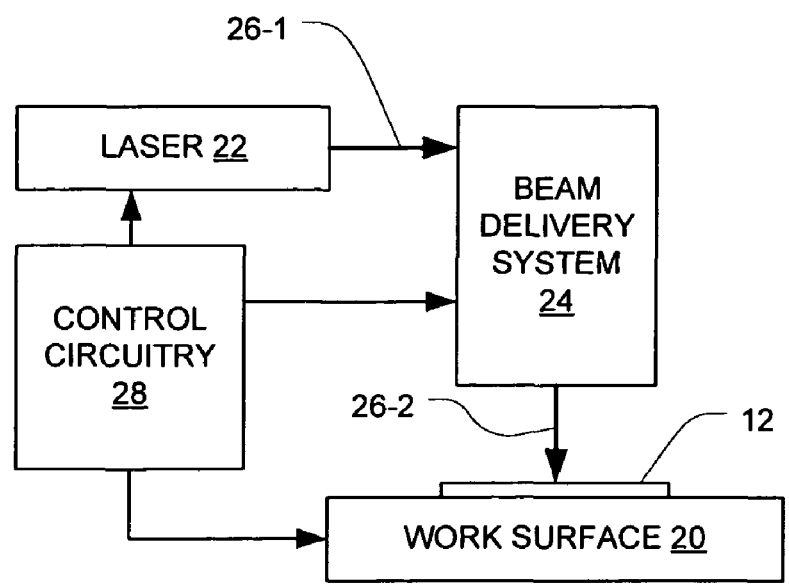
FIG. 2 is a schematic diagram of a laser-based system for manufacturing the scale of FIG. 1.

FIG. 2 shows apparatus that may be used to manufacture the scale 10 of FIG. 1. The substrate 12 is placed on a work surface 20 capable of holding the substrate 12 in place during processing. It may also be desirable that the work surface 20 provide for motion of the substrate 12 relative to the remainder of the processing apparatus, for example to move the substrate 12 in the X direction to produce the spaced-apart scale marks 14. The motion of the substrate may be carried out using a suitable displacement mechanism, for instance a translation or rotation mechanism for positioning a rigid substrate, or with respective tape feed, write and take-up spindles for positioning a flexible substrate, or other suitable mechanisms such as described below.

The scale marks 14 are formed on the substrate 12 by a laser 22 in combination with a beam delivery system 24. The beam delivery system 24 accepts laser source energy indicated as an incident beam 26-1, generally modifies the spatial and/or temporal distribution of the laser energy, and selectively directs laser energy (indicated as an output beam 26-2) to the substrate 12. For example, the beam delivery system 24 may include an anamorphic optical system to form a beam 26-2 having an elliptical cross section with a desired aspect ratio. The beam delivery system 24 may also include galvanometer-driven mirrors or similar apparatus used to steer (deflect) the incident beam 26-1 to form the output beam 26-2 directed to the substrate 12 and to scan or sweep the output beam 26-2 in the Y direction during processing to form each scale mark 14. The beam delivery system 24 may include a computer controlled modulator, for instance an acousto-optic modulator, to select laser pulses to be delivered to the substrate 12 and to control the power of the output beam 26-2. The beam delivery system 24 also generally includes a focusing sub-system, preferably having nearly diffraction-limited performance, that focuses a pulsed laser beam to form a spot intensity distribution on the surface of the substrate 12. As described in more detail below, each scale mark 14 is made by applying a series of pulses, overlapped in the Y direction and each having at least one corresponding focused spot intensity distribution, to the surface of the substrate 12. The operation of the laser 22 and the beam delivery system 24, as well as the motion of the work surface 20 if applicable, are all controlled by control circuitry 28. The use of an elliptical spot shape in laser processing of material is known in the art.

Examples are shown in U.S. Pat. Nos. 6,639,177 and 6,777, 645, in which FIGS. 13a-13c show three sequences of elliptical spots. FIG. 13a shows a first sequence for use with targets having a rounded corner; FIG. 13b shows a second sequence for use with targets having a squared-off corner; and FIG. 13c shows a sequence for use when a series of parallel lines are machined in the target material. Generally, the speed with which material can be processed is increased when elliptical spots are employed to make elongated marks as the marks 14.

Figure 3:
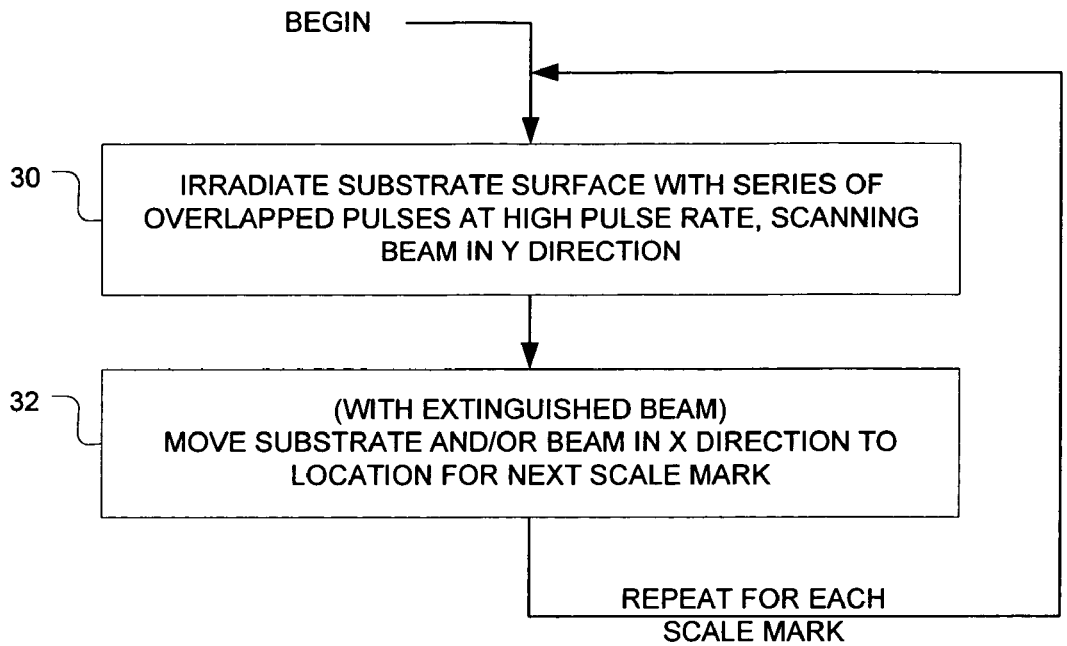
FIG. 3 is a flow diagram of a method of using the system of FIG. 2 to manufacture the scale of FIG. 1.

FIG. 3 illustrates the overall process of manufacturing the scale 10. At step 30, the control circuitry 28 causes the laser 22 and beam delivery system 24 to irradiate the surface of the substrate 12 with a series of pulses at a high pulse repetition rate. The output beam 26-2 from the laser 22 is scanned in the Y direction in synchronism with the pulses such that the pulses overlap by a desired amount, which is described in more detail below. To achieve this scanning, the beam 26-2 is swept by the beam deflection apparatus within the beam delivery system 24 as controlled by the control circuitry 28. At step 32 of the process of FIG. 3, the control circuitry 28 causes a relative movement in the X direction between the path of the output beam 26-2 (which is now extinguished, attenuated, or otherwise blocked) and the substrate 12 such that the laser beam is directed to the location of the next successive scale mark 14 to be made. As indicated, steps 30 and 32 are repeated for each scale mark 14 to be formed on the substrate 12.

In step 30, the amount of spot overlap and the number of pulses per scale mark 14 may vary in accordance with a number of factors, including the desired length of each scale mark 14, the effective diameter of the spot beam at the surface of the substrate, the distribution of energy within the spot beam at the substrate surface, and the desired characteristics of the scale marks 14 such as depth and coloring. Several specific examples are given below. The pulse repetition rate primarily affects the throughput of the process, i.e., the rate at which the scale marks 14 are formed on the substrate 12. By way of example, modern q-switched, diode pumped solid state lasers 22 are capable of producing pulses at maximum rates in the range of tens to hundreds of kHz. It will be appreciated that in any particular process the pulse rate may be less than the laser's maximum rate due to the need to synchronize the pulsing with the scanning of the beam delivery system 24. Alternatively, the laser 22 may operate at approximately its maximum rate (consistent with requirements of output pulse width and energy), and the computer-controlled modulator within the beam delivery system 24 may be used to select pulses. Also, further synchronization may be necessary between the Y-direction scanning of the beam 26-2 and the relative X-direction movement between the beam 26-2 of the work surface 20, and such synchronization may also affect the choice of pulse rate.

Figure 4:
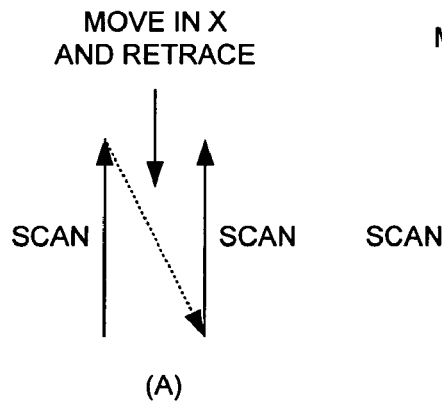
FIG. 4 (consisting of FIGS. 4(A) and 4(B)) is a diagram depicting two alternative patterns that may be followed by a laser beam during the method of FIG. 3.

FIG. 4 illustrates two different scanning and X-direction movement patterns that may be employed. FIG. 4(A) shows that all the scale marks 14 are formed by scanning in one direction. In such a case, it is necessary upon completion of a given mark 14 to both move in the X direction and to "retrace" the laser beam (while extinguished) in the Y direction to bring the beam 26-2 to the beginning location for the next mark 14. An alternative is shown in FIG. 4(B), which involves scanning alternating lines in opposite Y directions, such that no retrace of the beam 26-2 is necessary between marks 14. Generally, the alternating approach of FIG. 4(B) will provide higher processing throughput.

Figure 5:
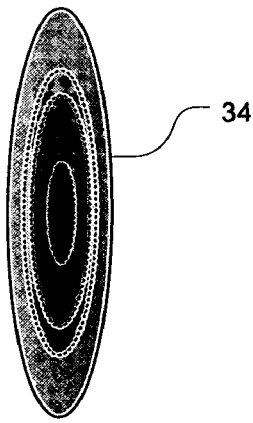
FIG. 5 is a diagram illustrating the spatial distribution of intensity in a laser beam spot in the method of FIG. 3.

FIGS. 5-6 illustrate the spatial shape and intensity profile of the beam 26-2 at the surface of the substrate 12 according to one embodiment. As can be seen in FIG. 5, the beam 26-2 forms a spot 34 having an elliptical shape with an aspect ratio of approximately 4:1. The shading indicates relative intensity, which is also shown in the plots of FIG. 6. FIG. 6(A) shows the intensity profile in the relatively narrow X direction, and FIG. 6(B) shows the intensity profile in the wider Y direction. This profile is referred to herein as "Gaussian". The peak intensity is denoted PK, and quantities of PK/2 and PK/$e^2$ are also indicated. The width of the pulse at PK/2 is indicated as "beam width half maximum" (BWHM) for both the X and Y directions. The beam width at PK/$e^2$ is indicated as simply "beam width" or BW. The beam width at PK/$e^2$ is measured by methods described in ISO standard ISO/TR 11146-3 knife edge method.

FIG. 7 shows the temporal distribution of the intensity of the spot 34, which is characterized by a temporal pulse width at half maximum (PWHM(T)) and a temporal pulse duration PW(T) that is defined as 2*PWHM(T). Several examples of different pulse durations PW(T) are given for examples described below.

The spot 34 is thus an elliptical irradiated area that is one of a series of overlapping spots that form a given mark 14. In one embodiment, the spot 34 has spatial dimensions BW(X) and BW (Y) of approximately 20 µm and 60 µm respectively. More generally, the aspect ratio of an elliptical spot may be in the range of about 2:1 to 6:1. An elliptical spot shape, particularly in combination with a high repetition rate of the laser 22, provides for improved production speed of the scale 10. However, in alternative embodiments other spot shapes may be used, such as circular for example.

FIG. 8 is a schematic illustration of a mark 14 as resulting from the pulsing and Y-direction scanning of the beam 26-2. Each curved line 36 represents one end of an elliptical area of impingement of the spot 34 on the substrate 12 for a single pulse, and the succession of curved lines 36 represents the successive areas of impingement of the spot 34 due to the pulsing of the laser 22 and concurrent Y-direction scanning by the beam delivery system 24. As shown, the successive impingement areas are separated by an overlap amount 38, examples of which are given below. Also shown is a mark width 39, which in the illustrated embodiment is 10 µm. In one example, a 1.5 Watt laser output beam 26-2 is pulsed approximately 1750 times at the surface of the substrate 12 to complete a one-mm-long mark 14 with about a 100 times overlap (i.e., with an overlap amount 39 equal to $\frac{1}{100}$ of the spot height PW(Y). Thus one-mm-long scale markings 14 can be produced at a rate of about 50-80 per second, i.e. 1750 pulses at repetitions of 175 kHz and a retrace to the next start position.

To form the marks 14, it is generally desired to deliver an amount of energy that forms a thin film of melted metal with each pulse, avoiding the creation of a chaotic distribution of the metal. Thus there should be no ejection or boiling of the metal. Using an infrared (IR) laser of the type described below with a pulse energy of about 0.5-1 J/cm² over the 1/$e^2$ diameter and an overlap of about 50-100 spots at pulse rates above 100 kHz, preferably 100-200 kHz, well-formed structures are formed on non-coated nickel alloys such as Inconel®, stainless steel etc.

Figure 9:
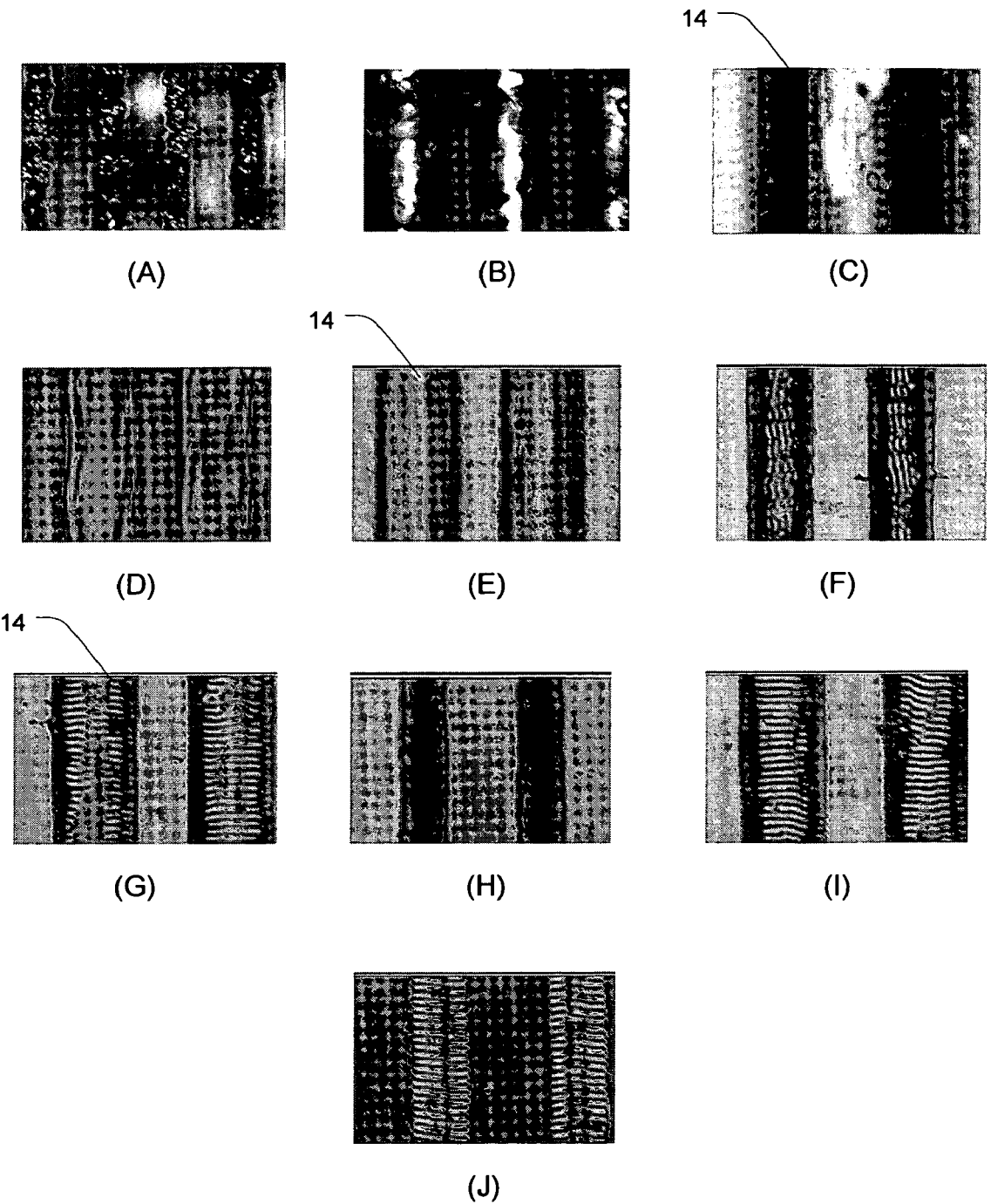
FIG. 9 (consisting of FIGS. 9(A) through 9(J)) is a set of microscopic images, obtained using an optical microscope and bright-field illumination, of sections of example scale marks on a substrate made using a system and method as those of FIGS. 2 and 3 for a variety of laser parameters.

FIG. 9 shows a number of images of sets of scale marks 14 that have been made using a variety of processing parameters. The marks are approximately 10 µm wide and spaced at a 20 µm pitch. The images were obtained with a microscope using bright-field illumination. The laser used to form the structures was a Spectra Physics BL6 infrared (IR) laser, which is suitable for high speed (100 kHz and above) operation with pulse durations from 5 to 50 ns at infrared wavelength of 1064 nm. An alternative laser that may be employed is the "V-XTREME" laser sold by Spectra Physics, which is capable of operation at 500 kHz. The laser beam was deflected using an X-Y galvanometer-based mirror system, model 6450 produced by Cambridge Technologies, Cambridge Mass. For these examples, the substrate material was Inconel® 625, which is a nickel alloy with good mechanical properties for linear gratings, high hardness, good polish, and coilability. This material has the following approximate constitution:

| | |
|---|---|
| Ni | 60% |
| Cr | 20% |
| Fe | 5% |
| Mo | 10% |
| Other | 5% |

The surface roughness Ra of the substrate prior to marking was specified to be no greater than 1 micro-inch (0.0254 μm). Ra is the "arithmetic mean" surface roughness, one of several available specifications for surface roughness. Ra is defined as the integral of the absolute value of the surface roughness profile over an evaluation length, wherein the sign of the roughness is therefore ignored.

The processing parameters for the Examples of FIG. 9 are summarized in Tables 1A and 1B below. The examples are referred to by the letters (A)-(J) appearing in FIG. 9. The following row headings are used:

| | |
|---|---|
| Polarization | Direction of polarization of laser beam |
| PWHM(T) | Pulse width (duration) between half maximum power points |
| Interaction time | Twice the value of PWHM(T); approximate total pulse duration |
| E avg | Average beam irradiance during interaction time (mega-Watts/cm$^2$) |
| f avg | Average beam fluence (energy density) during interaction time (Joules/cm$^2$) |
| Pulse rate | Repetition rate (in kHz) of pulses irradiating the substrate |
| Laser power | Laser average power setting (Watts) |
| Energy/pulse | Energy in a single pulse (micro-Joules) |
| Spot size | Dimensions of spot at substrate (measured at 1/e$^2$ of peak intensity as measured by the ISO 11134> knife edge method) |
| Pulses overlapped | Number of pulses overlapped, defined by the Pulse rate times the Spot size Y-dimension, divided by Speed |
| Speed | Linear velocity of spot during Y scanning |

TABLE 1(A)

| Label | A | B | C | D | E |
|---|---|---|---|---|---|
| Polarization (E field) | X | X | X | X | Y |
| PWHM(T) (ns) | 8 | 11 | 100 | 2.5 | 14 |
| Interaction time (ns) | 16 | 22 | 200 | 5 | 28 |
| E avg (MW/cm$^2$) | 148 | 71 | 16.5 | 2804 | 42 |
| f avg (Joule/cm$^2$) | 2.34 | 1.56 | 3.3 | 14.0 | 1.17 |
| Pulse rate (kHz) | 50 | 75 | 10 | 5 | 100 |
| Laser power (Watts) | 1.25 | 1.25 | 0.030 | 0.750 | 1.25 |
| Energy/pulse (uJoules) | 21.6 | 14.4 | 2.6 | 129.7 | 10.8 |
| Spot size (um) | 19 × 62 | 19 × 62 | 10 × 10 | 19 × 62 | 19 × 62 |
| Pulses overlapped | 31 | 47 | 100 | 3 | 62 |
| Speed (mm/sec) | 100 | 100 | 1 | 100 | 100 |

TABLE 1(B)

| Label | F | G | H | I | J |
|---|---|---|---|---|---|
| Polarization (E field) | Y | Y | Y | X | X |
| PWHM(T) (ns) | 23 | 23 | 32 | 14 | 14 |
| Interaction time (ns) | 46 | 46 | 64 | 28 | 28 |
| E avg (MW/cm$^2$) | 17 | 17 | 8.8 | 27 | 20 |
| f avg (Joule/cm$^2$) | 0.77 | 0.80 | 0.56 | 0.75 | 0.56 |
| Pulse rate (kHz) | 175 | 175 | 250 | 100 | 100 |
| Laser power (Watts) | 1.45 | 1.50 | 1.5 | 0.80 | 0.600 |
| Energy/pulse (uJoules) | 7.2 | 7.4 | 5.2 | 6.9 | 5.2 |
| Spot size (um) | 19 × 62 | 19 × 62 | 19 × 62 | 19 × 62 | 19 × 62 |
| Pulses overlapped | 109 | 109 | 155 | 129 | 62 |
| speed (mm/sec) | 100 | 100 | 100 | 48 | 100 |

Examples A and B exhibit what might be termed a "boiling" and "freezing" effect, with large frozen metal splash structures caused by an excessive amount of pulse energy delivered over very short interaction times. The scale marks have a chaotic, irregular structure, which is believed to result from heating the substrate well above its melting point. The ragged edges of these marks produce poorly defined gratings, and thus these examples are not well suited for use in a high-resolution optical encoder, due to the noise that they would create in a reflected optical signal. These examples exhibit what is referred to herein as "tearing", which is an uneven texture caused by the large fluence of the pulses excessively disturbing the material surface. This tearing is believed to be a different phenomenon than the fine regular microstructures described below.

Example C employs a markedly lower laser power of 0.030 watts with a longer interaction time of 200 ns, as well as a larger number of overlapped pulses. The spot shape is circular, and the overall pulse energy is similar to that of Examples A and B. As can be seen in FIG. 9C, the scale marks 14 are relatively deep furrows free of the chaos of Examples A and B, although they do exhibit crosswise striations. The marks of Example C are also a dark brown in color. The method used to make Example C is very slow and therefore may be impractical from a manufacturing perspective. Also, the uniformity of the dark regions while useful is not optimum.

Example D was made at a considerably higher pulse energy and relatively short interaction time, and only two pulses are overlapped. This example has essentially no microstructure, but rather large and uneven "tearing". It may be undesirable for use in an optical encoder due the unevenness and its relatively poor and/or noisy optical contrast between the marks and the surrounding unprocessed substrate.

Examples E through G have high quality edge definition with deviations much less than one μm, and provide excellent optical contrast with additional reflectivity reduction at the microstructured area of the examples F and G. These marks are unique in fine edge quality, good process control and the ability to provide smooth metal, chemically reacted color changes and microstructures that further alter at least one optical property of the substrate, for instance the directional reflectance. The microstructures, which have surface variations on the order of a near-infrared wavelength, generally scatter the incident light, and thereby provide for increased contrast. Example E exhibits a relatively smooth "furrow" structure (described below) with little microstructure and little color change. In Example E, the laser polarization is "longitudinal," i.e., parallel to the marks 14. Examples F and G were made with lower pulse fluence and greater pulse overlap, with longitudinal polarization in example F and transverse polarization in example G. Furrowing and brown coloration are apparent, and the microstructure follows the direction of polarization.

Example H also has longitudinal polarization and somewhat lower pulse energy, and takes on a blue color.

Example I is similar to Example G but produced at a higher irradiance level. Example J demonstrates that at a low fluence and an irradiance of about 20 MW/cm$^2$, a brown coloration and microstructuring occur with a minimum of furrowing. In some cases where deep structures are undesirable these flatter structures may be useful.

Overall, it appears that a pulse period of less than 10 ns and a pulse fluence of greater than about 1 J/cm$^2$ cause the metal to boil and erupt, producing ragged features as in Examples A and B. As demonstrated by the other examples, at less than about 50 MW/cm$^2$ irradiance and more than 25 overlapping spots, the chaotic behavior is eliminated and a smooth ridge and furrow structure is formed. From atomic force microscope (AFM) analysis of these examples as shown below, it appears that little material is removed, but rather material is primarily relocated from the center to the sides of the mark. The resulting structure appears to work well with contrast-sensing diffractive encoders. It is believed that the reduced on-axis reflectance of these structures is due, at least in part, to the furrowed shape which reflects light away from the narrow viewing range of an on-axis sensor. It is a typical base structure for the better-performing Examples, as described in more detail below.

Additionally, with irradiance from about 10 MW/cm$^2$ to 50 MW/cm$^2$ and an increased number of pulse overlaps to about 50 or more, an additional phenomenon occurs. First the material develops a substantial area of brown colored surface which can have further reduced reflectivity, which is desirable for increasing the optical contrast between the marks and the surrounding unprocessed substrate. In addition, the microstructures are formed in the brown surface on the furrow-and-ridge structure that appear to diffusely reflect light. It has been observed that with pulse fluence in the range of 2-3 J/cm$^2$ the furrow structure extended to the BW. At fluence less than about 1 J/cm$^2$ and Eavg about 50 MW/cm$^2$ or less, the furrow widths were about the same as the BWHM(X) dimension of the spot. The latter is a more desirable process point, because the steeper slope of the irradiance-versus-beam-width curve (FIG. 6A) produces less dimensional variation of the mark for a given variation in beam power of surface absorption.

Figure 10:
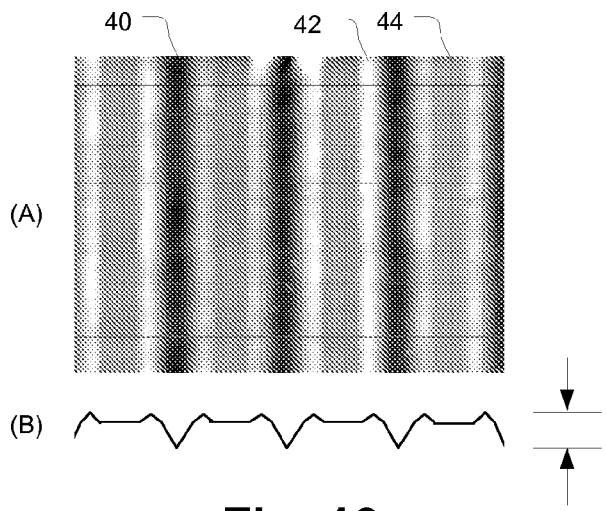
FIG. 10 (consisting of FIGS. 10(A) and 10(B)) includes an image of one of the scale sections of FIG. 9, obtained using an atomic force microscope, and a graph illustrating the crosswise topography of the scale marks.

FIG. 10 is an atomic force microscope image illustrating the topography of Example G of FIG. 9. In the image of FIG. 10(A), the darker areas 40 represent the deeper central areas of the furrowed marks 14; the lighter areas 42 represent the outer edges of the marks 14; and the medium-shaded areas 44 represent the unmodified surface areas 16 between the marks 14. FIG. 10(B) illustrates the cross-sectional relief. It will be observed that the outer edge areas 42 are actually higher than the unmodified surface areas 16. By the nature of the process, which induces surface melting to form the marks 14, little or no material is actually removed from the substrate 12. Rather, it is moved from the deeper areas represented by darker areas 40 to the outer edge areas represented by the lighter areas 42. The peak-to-peak distance 46 from the deeper areas 42 to the higher edge areas 44 is about 2.0 μm or less.

Figure 11:
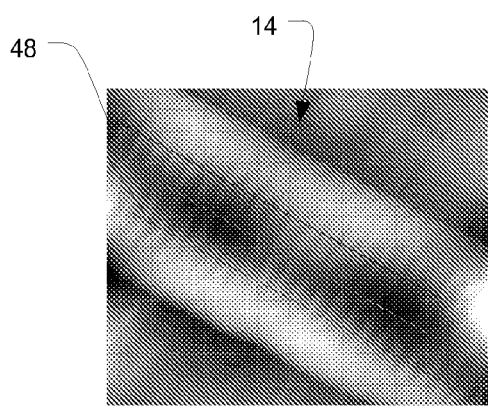
FIG. 11 is an image of one of the scale sections of FIG. 9, obtained using an atomic force microscope, illustrating the lengthwise topography of the scale marks.
Figure 11A:
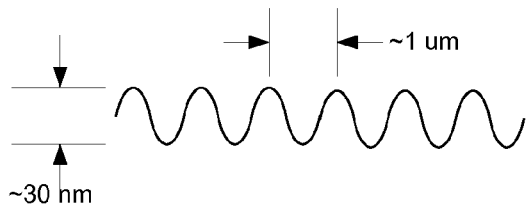

FIG. 11 is another atomic force microscope image of Example G giving a close-up view of one of the marks 14, which is shown slanting from upper left to lower right. The above-referenced "microstructure" is visible as a set of transverse ridges 48 indicated by alternating light and dark bands. As shown in more detail in FIG. 11a, the period or pitch of the ridges 48 is about one um, and their peak-to-peak height is on the order of 30 nm. It is believed that the ridges 48 are a phenomenon of selective absorption due to interference of the laser beam at the work surface as described in a book entitled "Laser Processing and Chemistry" by Buerle, specifically Chapter 28 pertaining to Instabilities and Structure Formation. These microstructures are further influenced by linear polarization of the laser as illustrated in the Examples. Circular polarization should produce little microstructure.

Figure 12:
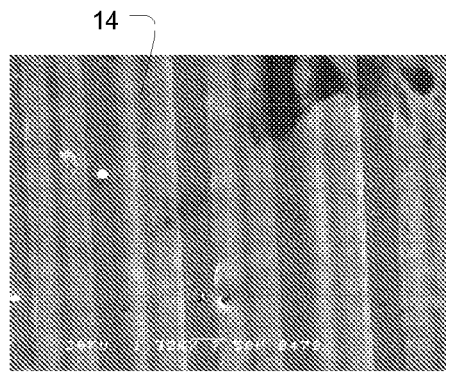
FIG. 12 is an image of one of the scale sections of FIG. 9 obtained using a scanning electron microscope.
Figure 13:
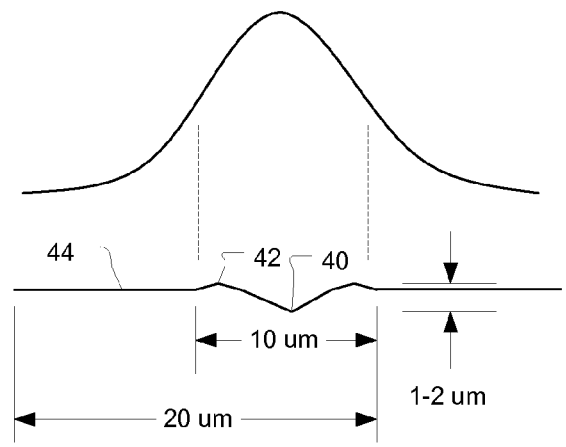
FIG. 13 is a diagram illustrating the crosswise topography and pertinent dimensions of an example scale mark.

FIG. 12 shows a scanning electron microscope (SEM) image of Example E of FIG. 9, which shows the desirable regularity and smooth, straight edges of the marks 14. FIG. 13 illustrates the crosswise dimensions of these marks, with the reflective non-processed areas 44 and the less-reflective central area 40 and edge area 42 of the marks. FIG. 13 also shows the relationship between the width of the marks and the width of the laser beam. As previously described, in the better examples the width of the mark 14 is approximately equal to the BWHM of the spot 34.

Figure 14:
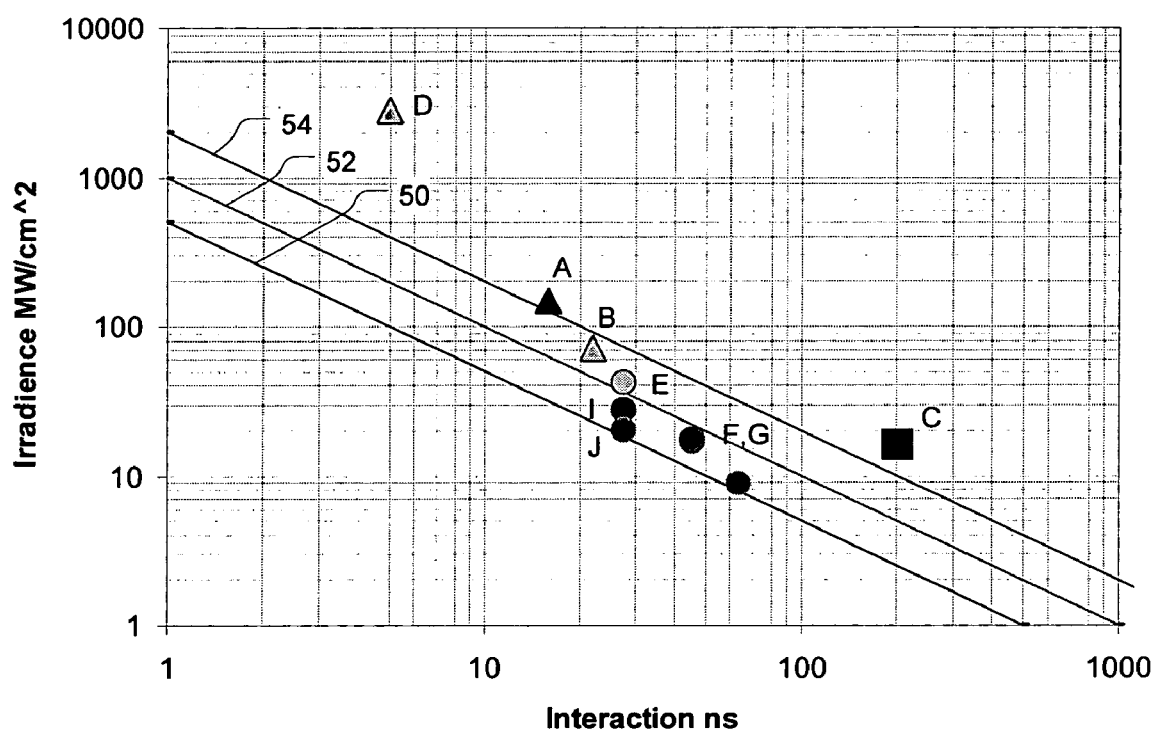
FIG. 14 is a plot of laser pulse intensity (irradiance) versus interaction time for several of the example scale marks of FIG. 9.

FIG. 14 shows a graph of data points representing the spot intensity or irradiance (in MW/cm$^2$) versus interaction time (in ns) for the Examples (A)-(J) of FIG. 9. The product of these quantities is the total energy density or fluence in J/cm$^2$. Three lines 50, 52 and 54 represent equal-fluence contours of 0.5 J/cm$^2$, 1.0 J/cm$^2$, and 2.0 J/cm$^2$ respectively.

Figure 15:
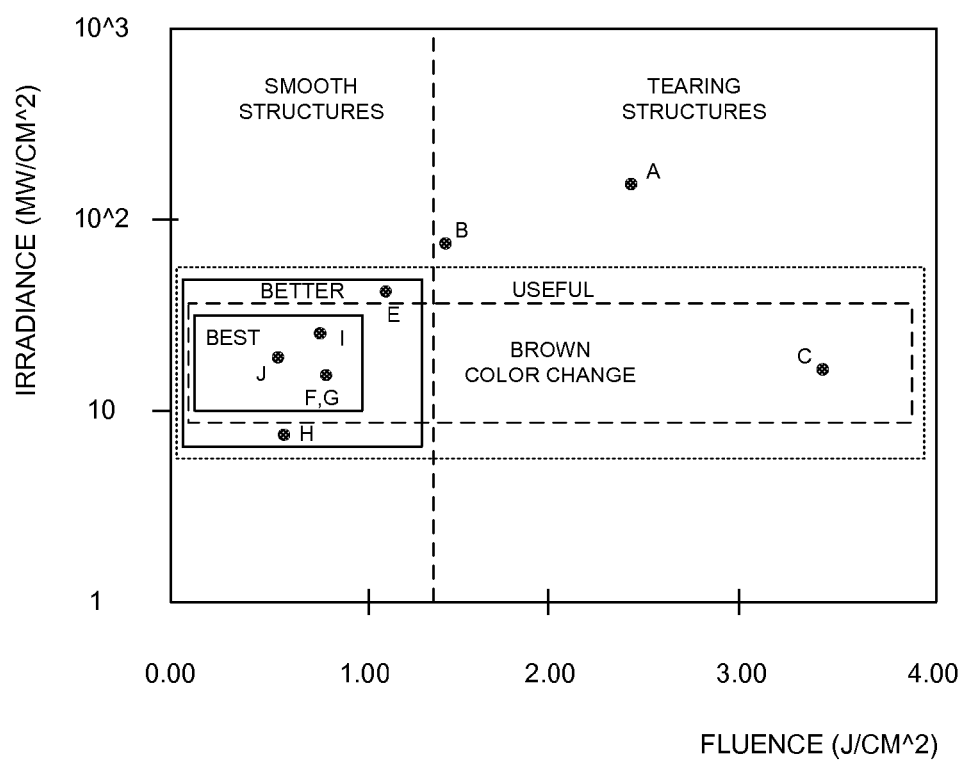
FIG. 15 is a plot of laser pulse intensity (irradiance) versus laser pulse energy density (fluence) for several of the example scale marks of FIG. 9.

FIG. 15 is a graph of irradiance versus fluence for the same Examples. Fluence less than about 1.4 J/cm$^2$ produces the smooth furrow structure, while a higher fluence produces a more turbulent, tear-like structure (tearing). The Examples falling within the box labeled "Useful", which include Examples C and E-J, are believed to be useful for making gratings or other optical elements for optical encoders. Of these, Examples C, F, G, I and J exhibit the brown color change and polarization-related microstructures on the furrow. The irradiance for these Examples falls within the range of 10-40 MW/cm$^2$. Example H, for which the irradiance is about 9 MW/cm$^2$, exhibits a blue color.

Further, it is believed that the Examples in the box labeled "Better" may provide better performance as optical scale marks, primarily due to their smoothness in contrast to the tearing of Example C. Of these "better" examples, Examples F, G, I and J are seen as the best, because they exhibit the desired brown color change in contrast to the relatively non-colored Example E and the blue of Example H. Other combinations of laser properties produced by different lasers may also produce these desired effects. For example, alternative wavelengths may have different absorption characteristics and yield results at different fluences and overlaps.

Figure 16:
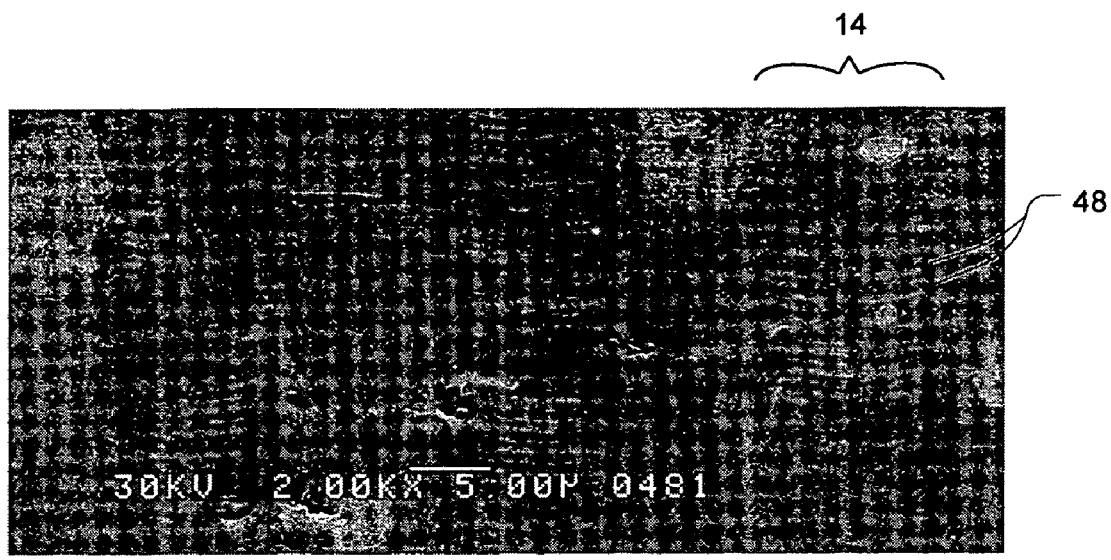
FIG. 16 (which includes FIGS. 16A and 16B) includes two images of sections of scales of FIG. 9 obtained using a scanning electron microscope.
Figure 16:
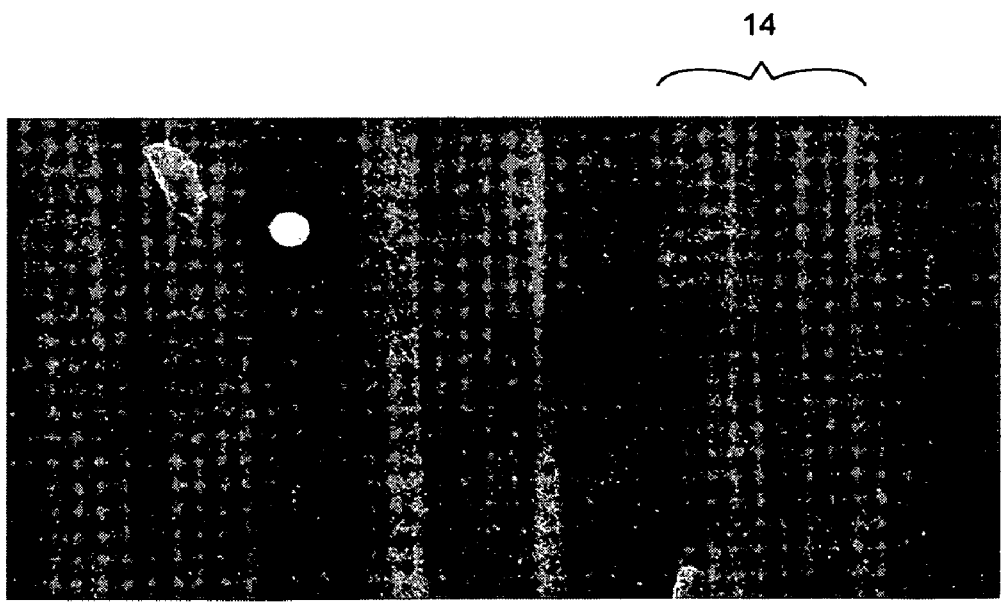

FIGS. 16(A) and (B) show SEM images of Examples G and E of FIG. 9 respectively. These images demonstrate variations that are possible for the marks 14. Specifically, the marks 14 of Example G (FIG. 16(A)) include the microstructure ridges 48, whereas the marks 14 of Example E (FIG. 16(B)) are substantially smooth, exhibiting essentially no microstructure. One of the advantages of the disclosed technique is the ability to obtain marks 14 having long edges that are very straight, e.g., straight to within a small fraction of the pitch, for example 10% of the width of a mark 14. Also, it is possible to form the marks 14 with a relatively uniform depth of less than about 1.5 to 2 μm. Furthermore, it will be appreciated that the disclosed technique preferably employs a non-plated, nickel-based substrate 12 such as Inconel® or Invar® and a pulse energy of less than about 1 J/cm$^2$. The structures created by the disclosed technique are highly durable and resistant to chemicals and abrasion.

The presently disclosed technique may be utilized with smaller or larger beam spots. In any particular laser processing system, the minimum spot size will normally be determined by the focusing ability of the beam delivery system 24, and the maximum spot size by the required power density and the maximum power of the laser. It is generally possible to obtain wider marks 14 by increasing the width of the beam spot. However, to obtain a similar power density requires that the laser power be increased accordingly, and thus there are practical limits to the widths of the marks 14 based on maximum laser power. As an alternative way to achieve wider marks 14, multiple narrower marks can be made immediately adjacent to each other, such that there is no intervening unprocessed area 16. An example of such processing is shown below in the creation of a "darkened area" as an enhancement to a multi-track grating for an optical encoder.

Figure 17:
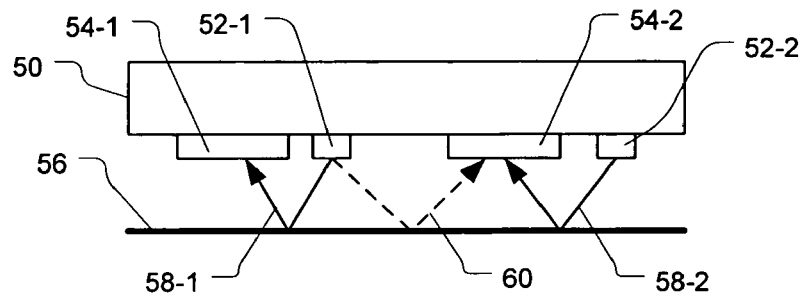
FIG. 17 is a schematic illustration of an optical encoder utilizing two light sources to illuminate separate tracks.

FIG. 17 illustrates one configuration of an optical encoder that employs multiple tracks that are separately sensed. The encoder includes a substrate 50 on which are located two light sources 52-1 and 52-2 (such as vertical cavity surface-emitting lasers (VCSELs)) and corresponding detectors 54-1 and 54-2. The substrate 50 is placed opposite a reflective scale substrate 56 on which are formed separate scales/gratings or other optical elements. An example of such a substrate 56 is described with reference to FIG. 18 below.

Also shown in FIG. 17 are two light paths 58-1 and 58-2 which the light from the respective light source 52-1 and 52-2 travels to reach the respective detector 54-1 and 54-2. Although the light paths 58-1 and 58-2 are the predominant paths along which the light from the light sources 52-1 and 52-2 travels, especially in the case of VCSEL sources which are highly directional, light from the sources 52-1 and 52-2 also generally travels other paths of a more incidental nature, including paths from either of the light sources 52 to the non-corresponding detector 54. In FIG. 17, an example is shown at 60, which is a path from the light source 52-1 to the detector 54-2. Light traveling the path 60 is an example of "optical crosstalk" in which the operation of one scale track is adversely affected by the proximity of another track, specifically the light source of the other track, such as by reducing the optical signal-to-noise ratio of the affected track.

Figure 18:
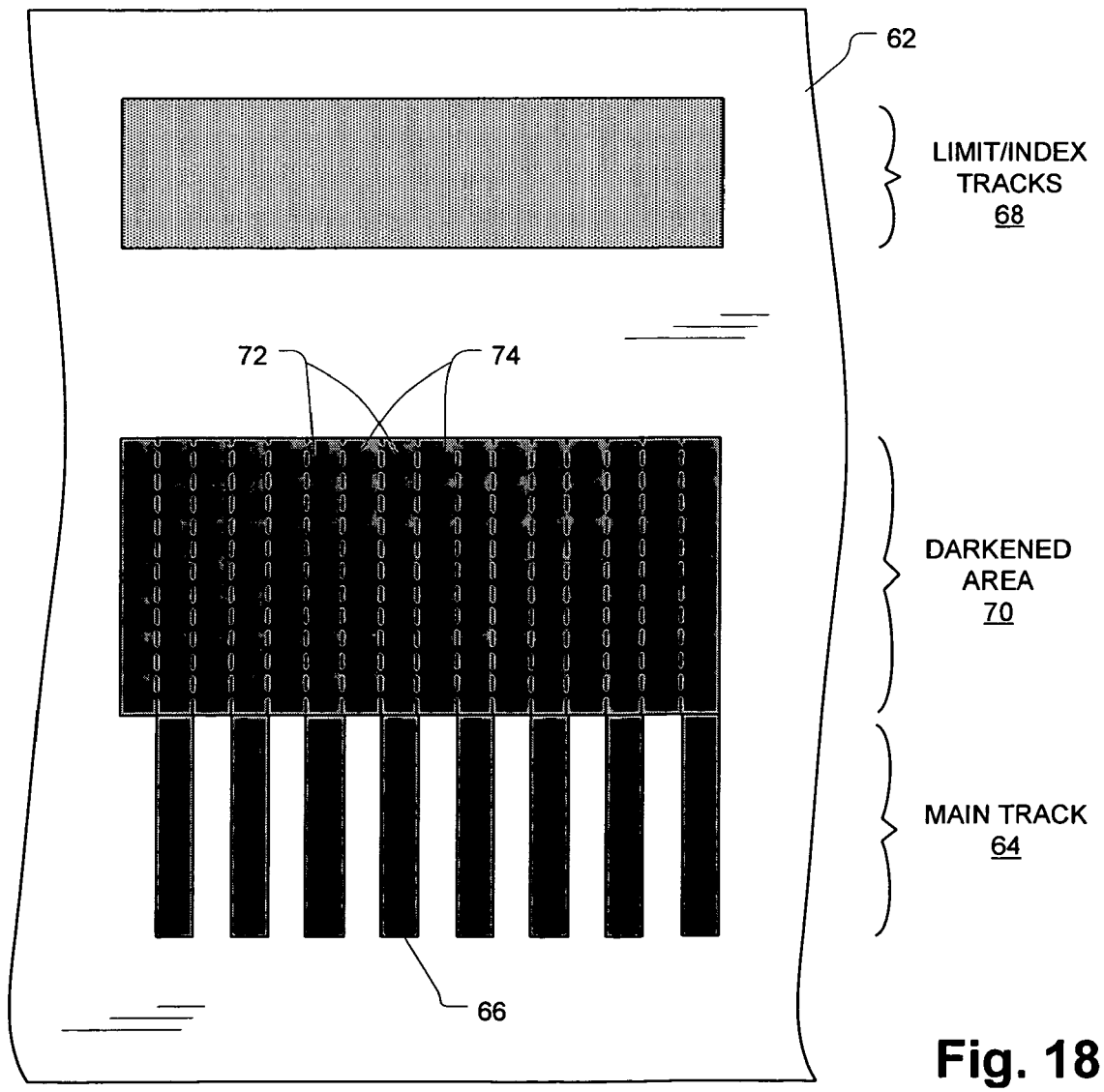
FIG. 18 is a schematic illustration of the layout of a scale substrate for the optical encoder of FIG. 17 using a darkened area formed by a system and method like those of FIGS. 2 and 3.

FIG. 18 illustrates a scale substrate 62 that is designed to reduce the level of optical crosstalk between adjacent tracks. The substrate 62 includes a main track 64 which is a grating pattern of equally-spaced low-reflectance marks 66, as well as a second track 68 that includes other optical elements such as a limit marker or an index marker (not shown). The tracks 64 and 68 are separated by a low-reflectance "darkened area" 70. Incidental light that is emitted from the light source for either track (e.g., for main track 64) in the direction of the other track (e.g., second track 68) is attenuated by the reduced reflectance of the darkened area 70, thus reducing the level of optical crosstalk between the two tracks.

The darkened area 70 can be formed using the above-noted process of placing relatively narrow marks immediately side-by-side. In the illustrated embodiment, the darkened area includes first portions 72 interspersed with second portions 74. The first portions 72 may be formed as extensions of the marks 66 of the main track, i.e., each mark 66 and its collinear first portion 72 may actually be formed in one scan. In such a case, the second portions 74 can be formed using shorter scans that are offset from the scans for the marks 66 and first portions 72. Of course, it is also possible to form the darkened area 70 in a separate set of scans from those used to form the marks 66.

Figure 19:
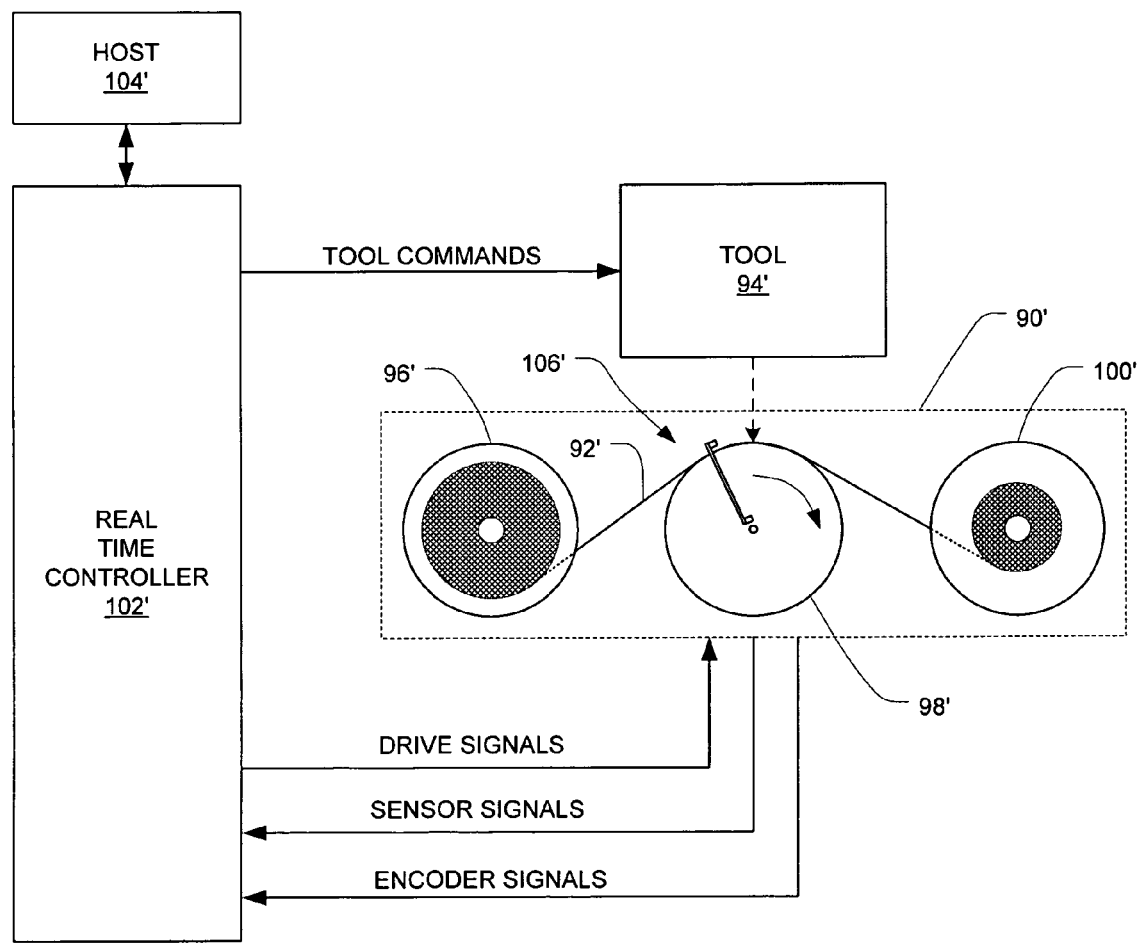
FIG. 19 is a block diagram showing several components of a system for workpiece processing.

FIG. 19 is a block diagram showing several components of a system for processing a workpiece having a flexible substrate. By way of example, the system may be used to form a flexible metrological scale by irradiating a substrate surface with a series of laser pulses to form marks having optical contrast, as described in more detail below.

The workpiece processing system includes a material handling system 90' for moving an elongated, flexible workpiece 92' past a tool 94' that performs a desired processing of the workpiece 92', examples of which are given below. The material handling system 90' includes three rotating spindles: a feed spindle 96', a processing spindle 98', and a take-up spindle 100'. During processing, the workpiece 92' travels off of the feed spindle 96', across the processing spindle 98' where it interacts with the tool 94', and onto the take-up spindle 100'. The area of interaction on the workpiece 92' is termed the "work area". In the illustrated embodiment, the processing spindle 98' rotates clockwise as shown, and the feed and take-up spindles 96', 100' both rotate counter-clockwise. The operations of the tool 94' and material handling system 90' are controlled by a real-time controller 102', which in turn receives operating parameters and higher-level control from a host computer (host) 104'. One or more sensors 106' may be employed for monitoring at least one parameter that may affect a position at which the tool 94' interacts with the workpiece 92' and provides feedback information to the real-time controller 102' for accurate overall processing of the workpiece 92'.

Hereinafter the description will primarily be directed to a workpiece 92' in the form of an elongated metal substrate referred to herein as a "tape", and the processing of the tape into a precision metrological tape scale having contrasting marks, although it will become apparent that broader application exists for at least one sub-system, as generally depicted in FIG. 19. The system may have use in other workpiece processing applications where an energy-delivery system or other type of tool 94' controllably modifies, interacts with, or otherwise affects a physical property of the workpiece 92'. For example, workpiece material may be removed, melted, annealed, etched, or chemically altered, or material may be deposited, bonded, or attached to the workpiece 92'. Preferably the system provides for workpiece positioning to support processing with an accuracy of about 10 μm/m or better, and operates to this desired specification despite variations over time and temperature.

Figure 20:
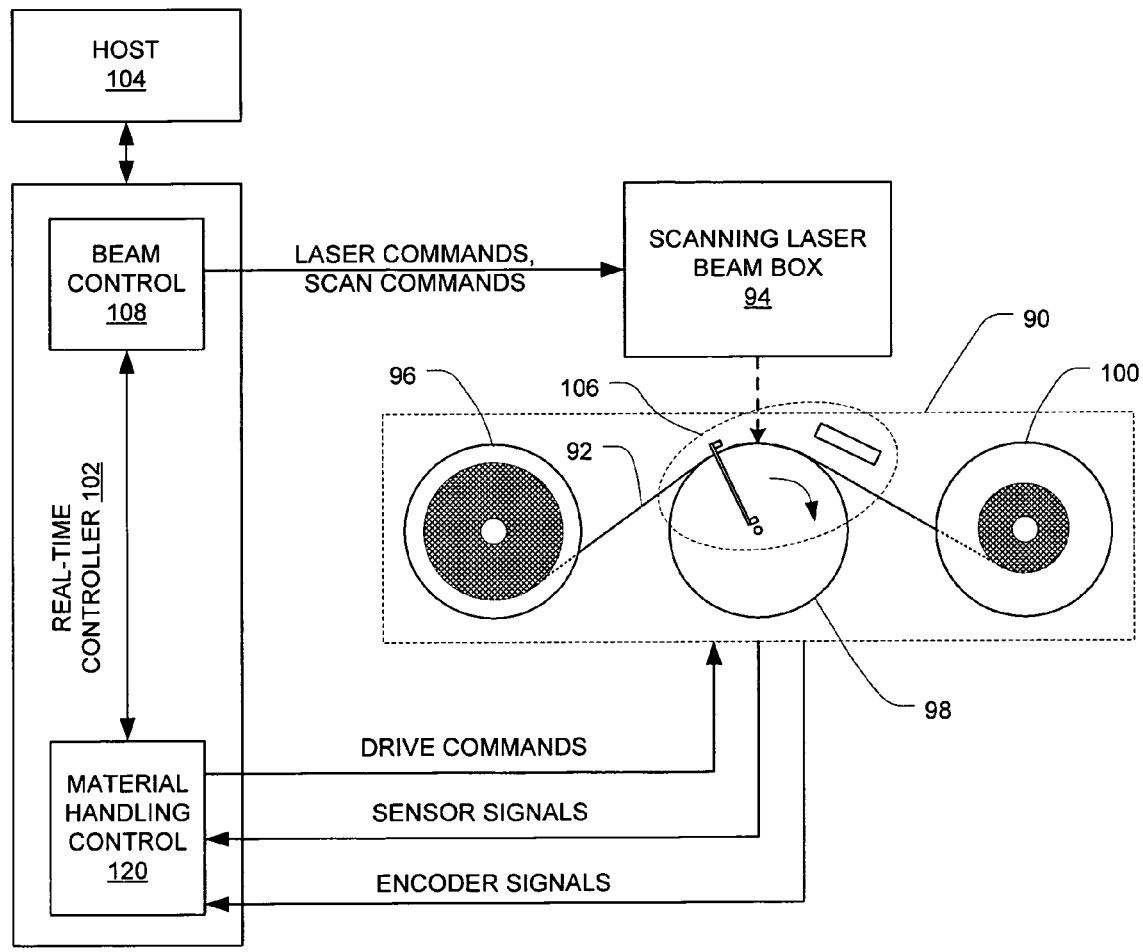
FIG. 20 is a block diagram showing several components of a system for laser processing a flexible workpiece to form a metrological tape scale.

Referring to FIG. 20, a laser-based system for producing a metrological tape scale in accordance with embodiments of the present invention includes a scanning laser beam box 94 that includes a laser source and a beam delivery/scanning system (not shown) that accepts source energy and directs energy to a processing area. The system further includes a material handling system 90 with a precision write spindle 98 that moves a flexible metal tape 92 between a feed spindle 96 and a take-up spindle 100; one or more sensors 106 for monitoring at least one parameter that may affect a position at which a laser beam from the laser beam box 94 impinges the metal tape 92; and a real-time controller 102 in communication with various system elements and a host computer (HOST) 104. More specifically, the real-time controller 102 includes a beam box controller (beam control) 108 and a material handling system controller (material handler control) 120.

Figure 21:
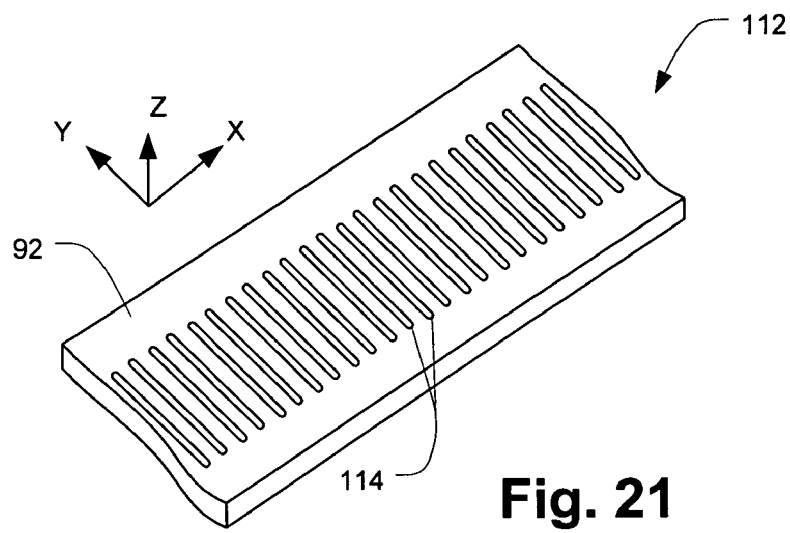
FIG. 21 is a diagram of a portion of a metrological scale formed with the system of FIG. 20.

FIG. 21 shows a section of tape scale 112 made in accordance with the disclosed system and methods. The tape scale 112 includes marks 114 that form scale graduations on the flexible metal tape 92 as shown. Each mark 114 is made by a series of energy pulses from the laser beam box 94 as the tape 92 travels beneath it, and successive marks 114 are made by repeating the series of pulses at a specified rate in synchronism with the movement of the tape 92 across the write spindle 98. When measured with a surface profilometer, the marks 114 may have a generally furrowed cross section that includes indentations and protrusions that create optical contrast such as described above. The marks 114 may also include nearly periodic microstructures, having a period on the order of an optical wavelength, that are correlated with a direction of non-circular laser polarization. Also shown in FIG. 21 is a 3-dimensional coordinate system used in the description below. The positive X direction is taken to be the direction of travel of the tape 92 during processing; the positive Y direction is taken to be orthogonal to the Y direction in the plane of the tape 92; and the positive Z direction is taken to be orthogonal to and out of the plane of the tape 92 as shown.

Referring again to FIG. 20, in a typical configuration the tape 92 may be a continuous flexible ribbon of material, for instance a flexible metal tape, and may be approximately 6 millimeters (mm) wide and 0.152 mm thick for example. In the precision material handling system 90, the tape 92 is coiled on the feed spindle 96, passed over the top of the write spindle 98, and affixed to the take-up spindle 100. Tension in the tape 92 is controlled indirectly through control of torque in the feed and take-up spindles 96, 100 during operation as is described below. 30 meters of tape is easily accommodated on 200-mm diameter reels. The write spindle 98 controls the feed of the tape 92. The sensors 106 preferably include one or more radius sensors for measuring deviations in the radius of the tape as it travels along an upper arc portion of the write spindle 98 during processing, as described in more detail below. The radius sensor information provides for velocity control and is therefore also generally useful for controlling the pitch or spacing of the marks 114. The sensors 106 may also include optional downstream readers to directly monitor the pitch or other dimension of the marks 114 for calibration or diagnostics, or for closed loop, real-time pitch control so as to correct for low frequency deviations from a desired pitch.

Figure 22:
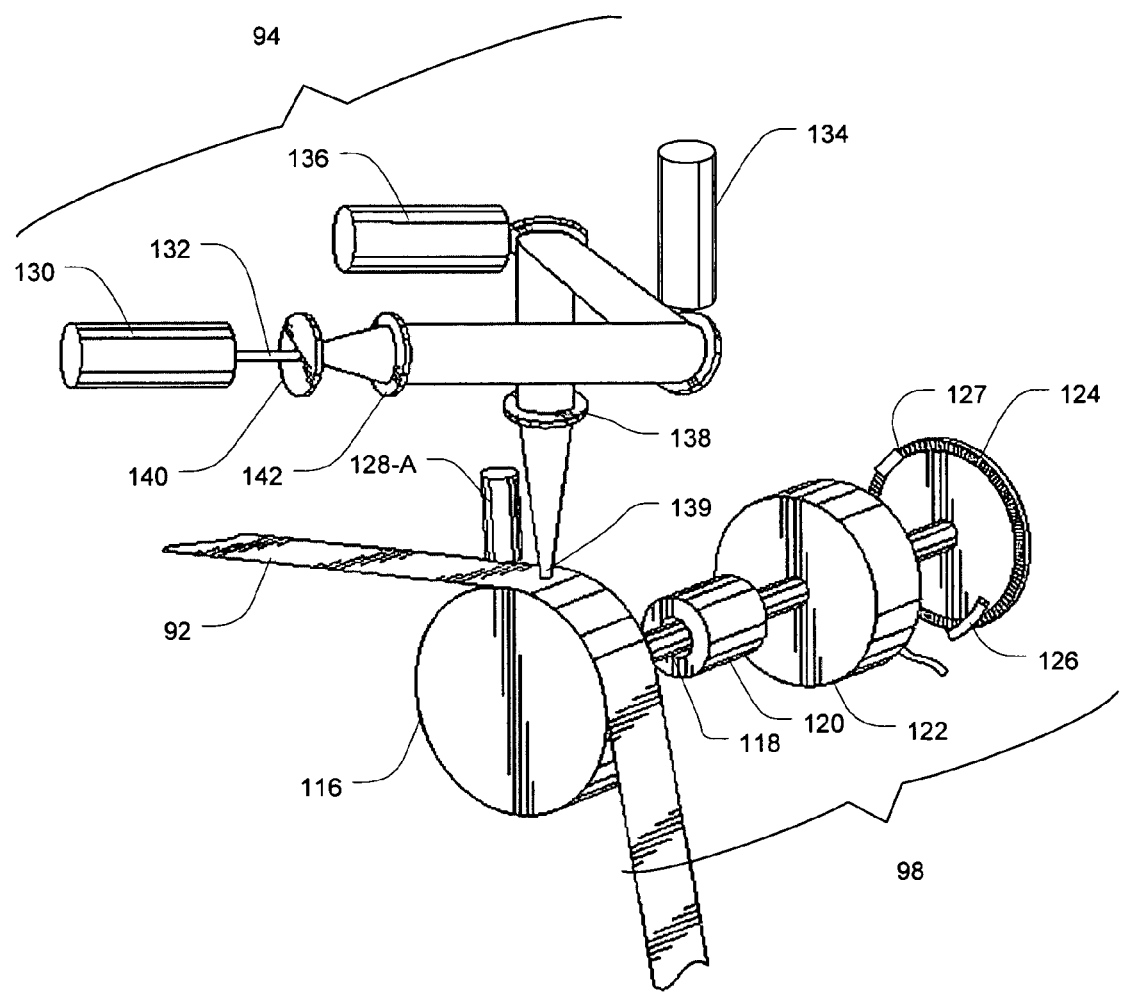
FIG. 22 further illustrates a portion of the system of FIG. 20 in greater detail.

FIG. 22 shows additional details of the system of FIG. 20. The tape 92 is draped across a write spindle drum 116 and engages by friction so as not to slip by the differential torques of the feed spindle 96 and take-up spindle 100 of FIG. 20. The write spindle drum 116 rotates on a shaft 118 in an air bearing 120 driven by a low ripple motor 122. By way of example, a commercially available low ripple, brushless motor 122 is the Airex 5.5 RBLT, available from Airex Corporation (Dover, N.H. 03820, see www.airex.com/products/rotary.htm). Also, a commercially available air bearing 120 may be one of models TRT150/200 from Precitech Inc., (Keene, N.H.) a manufacturer of standard and customized air-bearing components (www.precitech.com).

The rotational velocity of the spindle drum 116 is measured by an encoder disk 124 and at least one sensor 126, which is also referred to as a "read head". By way of example, encoder sensor 126 may be Model 52150, manufactured by MicroE Systems of Natick, Mass. (www.microesys.com). One or more additional sensors or read heads 127 may also be used as described below. A radius sensor 128-A provides part of the measurement of the overall radius of the spindle drum 116 and tape 92 as described in more detail below. The radius measurement is used to compensate for thickness variations and runout by certain operations of the real-time controller 102 as described in more detail below.

The construction of the feed spindle 96 and take-up spindle 100 of FIG. 20 is similar to that of the write spindle 98 in that they have a similar shaft 118, air bearing 120, motor 122 and encoder disk 124 and sensor(s) 126.

Also shown in FIG. 22 are several components within the beam box 94. A laser 130 emits a beam 132 that corresponds to one or more pulses that is accepted by a beam delivery system and delivered to the tape 92. The beam 132 is projected to an X scanner 134 and then reflected to a Y scanner 136, which directs the beam 132 through a scan lens 138 which focuses the beam 132 to a spot 139 on the tape 92. The X and Y scanners 134, 136 may be galvanometer-based mirror scanners, for instance the model 6450 produced by Cambridge Technologies, Cambridge, Mass.

The laser beam spot 139 may have an elliptical shape as described above and as taught in U.S. Pat. No. 6,777,645, assigned to the assignee of the present invention. An elliptical spot may provide for higher-throughput material processing. Generally, an anamorphic optical system is used to create the elliptical spot 139. In the system of FIG. 22, an anamorphic optical system includes a complementary pair of cylindrical lenses 60 and 62. The spot 139 has an X/Y aspect ratio of about 4/1, although other ratios can be used with suitable variations in pulse rates (e.g.: >20 kHz, >100 kHz preferred) and cut velocities and desired pulse overlap (e.g.: 10-100 spots overlapping, as measured at $1/e^2$).

In one embodiment the laser 130 may be a Spectra Physics BL6 laser, which is suitable for high speed (100 kHz and above) energy pulses of light with pulse durations in the range of 5 to 50 ns and an infrared wavelength of 1064 nm. This process is thermal in nature and as such almost any laser wavelength with proper energy and beam shape will work on metals such as Inconel and other nickel based alloys. For example green and UV lasers may be used with these material, although the infrared wavelength is probably the more practical today. For other materials like ceramics, UV lasers may be more suitable because they have better energy coupling into the substrate. Generally, pulsed lasers are operated in q-switched, gain switched, or mode locking Yet another example may be a MOPA system. Although well formed structures can be rapidly produced with nanosecond diode-pumped, q-switched lasers, other lasers may be incorporated in a system of the present invention. Such lasers may be ultra-short lasers, excimer lasers, and the like. The absorption properties of alternate lasers and materials may be taken into account for scaling the process settings In at least one embodiment a structure is created by irradiating the substrate with laser pulses, each pulse having: pulse width (measured at half maximum) in the range of about 10-40 nanoseconds, a spot distribution (measured over the $1/e^2$ diameter) with energy density in the range of about 0.1-1 $J/cm^2$, and at least some pulses spatially overlapping about 10-50 times, the pulses being generated at a rate of about 100 kHz or greater. In at least one embodiment a furrowed structure is produced that results in optical contrast at least 4:1. The laser pulses may employ non-circular polarization oriented at about 0 degrees or about 90 degrees to the length of the structure.

Figure 23:
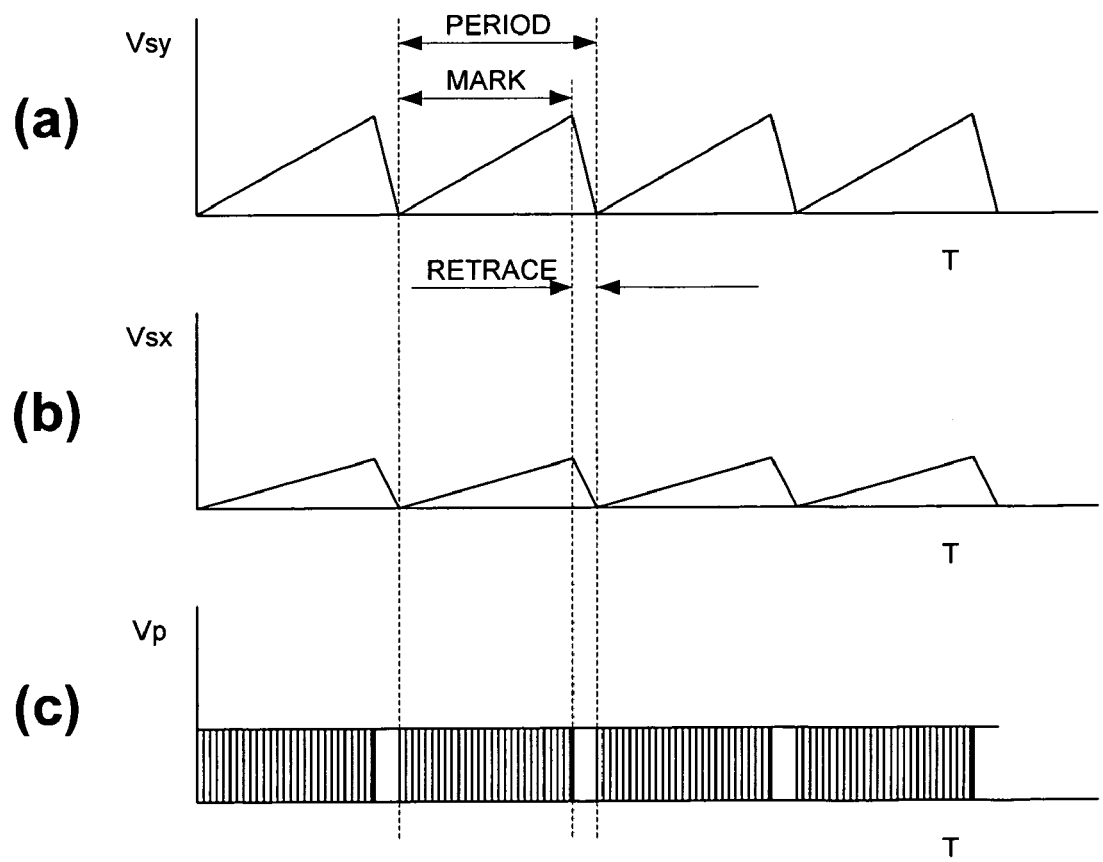
FIG. 23 illustrates typical command signals provided to an optical scanner and pulsed laser in the system of FIG. 20.

FIG. 23 shows scan and laser pulse control signals provided to the components of the beam box 94 from the beam box controller 108 of FIG. 20. The following signals are shown:

| | |
|---|---|
| Vsx | X scanner control |
| Vsy | Y scanner control |
| Vp | Laser pulse control |

Each mark 114 is made over a period which includes an interval of forming the mark using laser pulses and a brief interval of "retrace" in which the beam 132 is re-directed to a starting position for the next succeeding mark 114. The ramp shape of the signals Vsx and Vsy effects a sweeping of the beam spot 139 in the X and Y directions as marking occurs. The Y direction sweeping of the beam 132 is responsible for the elongated shape of the mark 114. The X direction sweeping is necessary to track the tape 92 as it moves across the write spindle drum 116 during the time it takes to make one mark 114. During the marking portion of the period, the beam 132 is pulsed numerous times as indicated by the vertical lines in the signal Vp. Generally, it is desired that the separation between successive pulses is substantially less than the Y dimension of the spot 139, i.e., that there is considerable overlap among successive pulses. Upon completion of a mark 114, the spot 139 is swept in the opposite X and Y directions to bring it to the starting point for the next mark 114, and during this retrace interval no beam pulses are generated as indicated by the lack of vertical lines in the signal Vp. In one example, a 1.5 Watt laser output beam is pulsed approximately 1750 times at the surface of the substrate to complete a one-mm-long mark 94 with about a 100 times overlap (i.e., with an overlap amount equal to $\frac{1}{100}$ of the spot height PW(Y). Thus one-mm-long scale markings 114 can be produced at a rate of about 50-80 per second, i.e. 1750 pulses at repetitions of 175 kHz and a retrace to the next start position.

Scan controllers capable of controlling a beam box such as beam box 94 in the above-described manner are generally known in the art and may be described in numerous patents owned by the assignee of the present invention. For example, a "user-friendly" X-Y scanner control system is available from the assignee of the present invention, Cambridge Technologies, and others, and are routinely integrated in laser processing equipment utilizing commercially available q-switched laser systems, and other lasers for laser-based marking and material processing. Many systems utilize various displacement mechanisms to position a workpiece relative to a laser beam.

Although in the illustration only a single spot 139 corresponding to one emitted laser pulse is shown, other combinations may be used in other embodiments of the present invention. For instance, the beam 132 may be split temporally or spatially in a manner coordinated with the movement of the tape 92 to produce multiple pulses. Such combinations can effectively increase the pulse repetition rate or allow for parallel material processing, both which can improve throughput if needed (e.g.: for a low rep-rate laser). Similarly, multiple laser or beam boxes could be employed.

Figure 24:
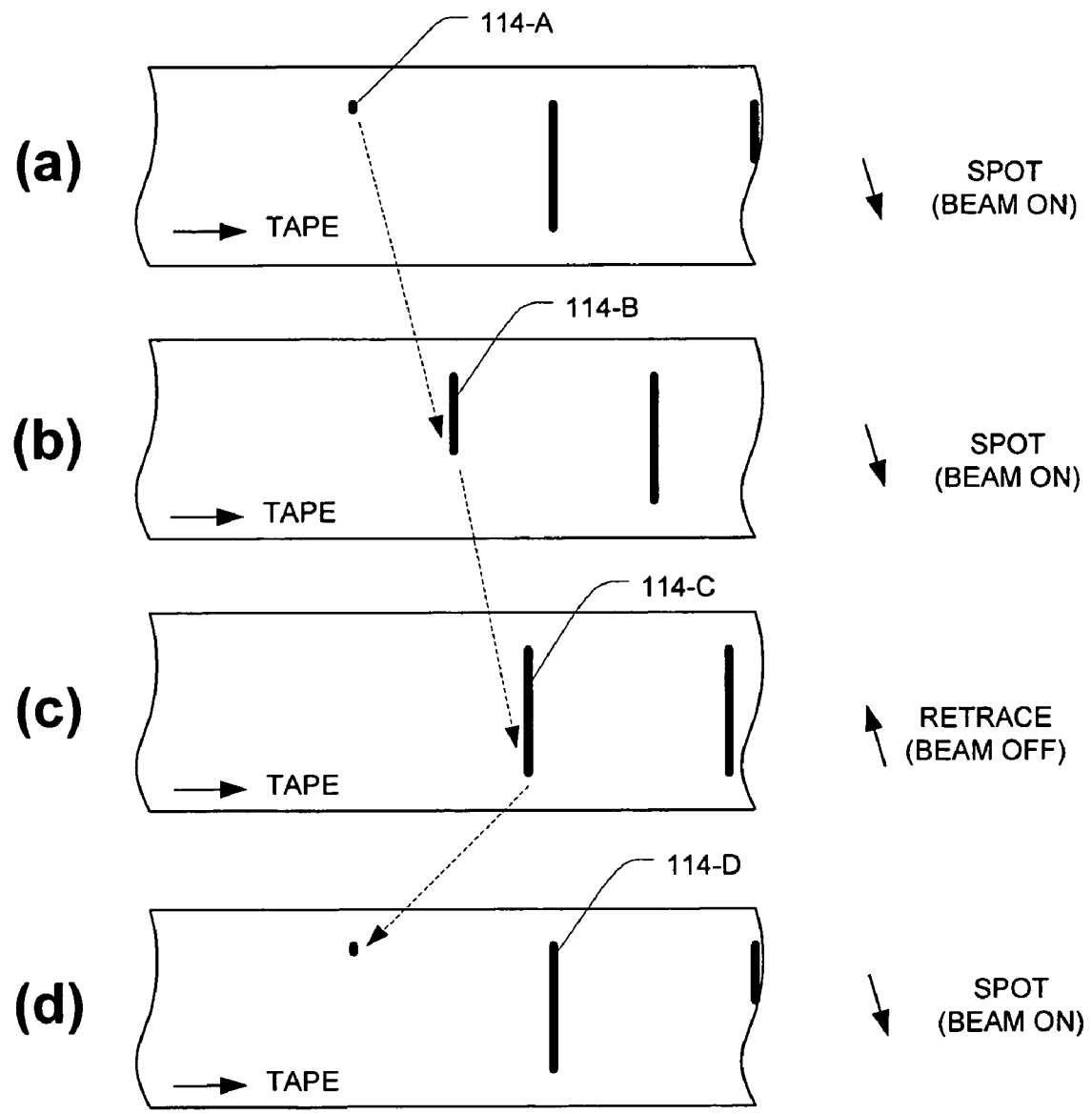
FIG. 24 is a diagram depicting how a single scale mark is made on a tape scale as it moves on a write spindle according to the disclosed scale manufacturing method.

FIG. 24 depicts the movement of the tape 92 and spot 139 as a single mark 114 is formed. Throughout the sequence the tape 92 is assumed to be traveling at constant speed in the positive X direction (toward the right in FIG. 24). In FIG. 24(a), the spot 139 is at a starting end of a new mark 114 which is shown as an initial mark portion 114-A. The laser beam 132 is being pulsed and scanned in both the X and Y directions as described above. In FIG. 24(b) the spot 139 is now at about the mid-point of its travel, having formed a first half mark portion 114-B. In FIG. 24(c) the spot 139 is at the end of its travel, and the mark 114 is a substantially complete mark 114-C. At this point the pulsing of the beam 132 is stopped such that the spot 139 is temporarily extinguished for the ensuing retrace, during which the scanners 134 and 136 of FIG. 22 are controlled to quickly re-direct the spot 139 to the beginning of the next successive mark 114 as shown in FIG. 24(d). A fully formed mark 114-D has been made. The process of FIG. 24 is repeated for each successive mark 114.

It should be noted that spacing between adjacent marks 114 in FIG. 24 is exaggerated for clarity of description. For a tape scale having a smaller mark spacing such as the tape scale 112 of FIG. 21, the ratio of Y-direction movement to X-direction movement of the spot 139 may be substantially higher.

Figure 25:
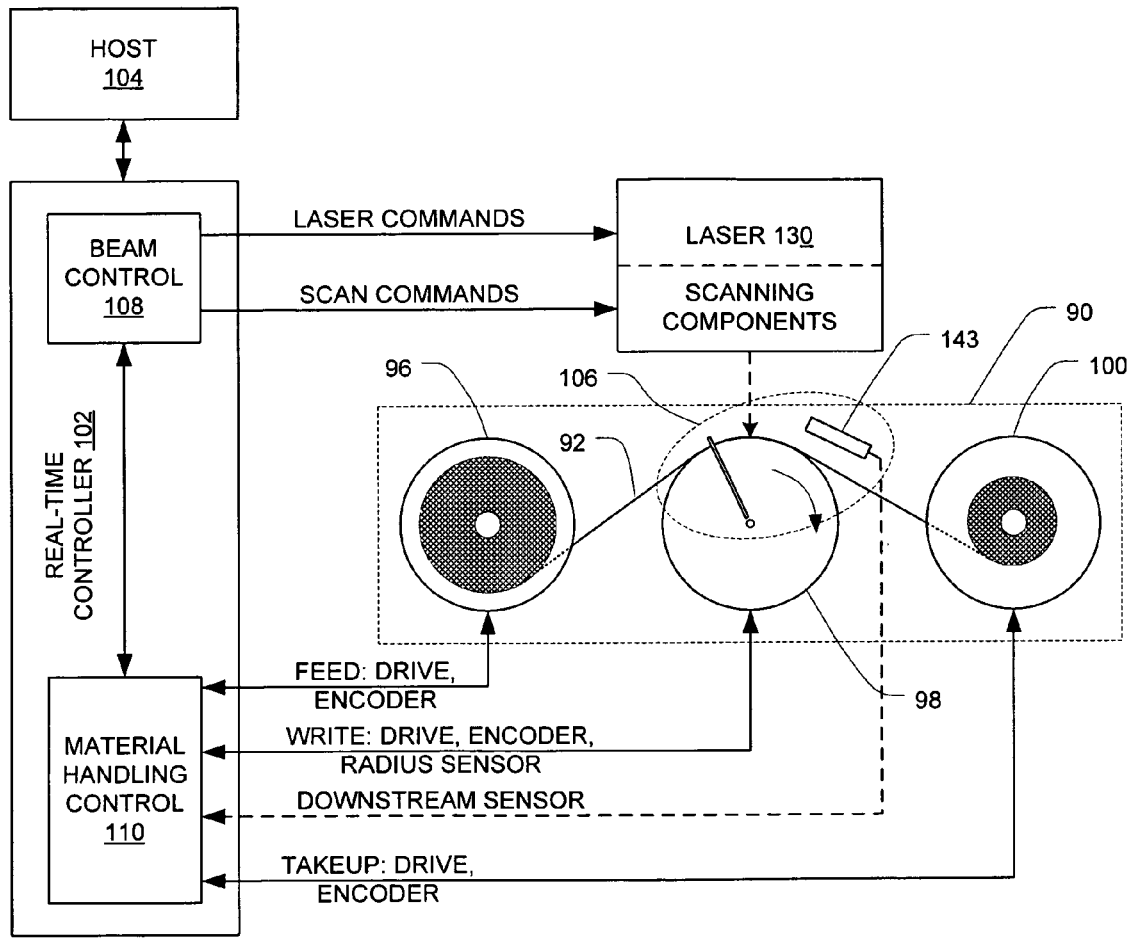
FIG. 25 is a block diagram of the system of FIG. 20 showing additional details of signals used between a real-time controller and spindles of a material handling system.

FIG. 25 shows a slightly more detailed view of the system of FIG. 20, in particular showing various signals to and from the feed spindle 96, write spindle 98 and take-up spindle 100. The material handler controller 110 generates drive signals for the feed, write and take-up spindles 96, 98 and 100, and receives respective encoder signals from these spindles as well. In addition, the material handler controller 110 receives radius sensor signals from the write spindle 98. An additional "downstream" sensor 143 may be included within the sensors 106 as described below, in which case the material handler controller 110 also receives a sensor signal from such downstream sensor(s) 143 as well.

Figure 26:
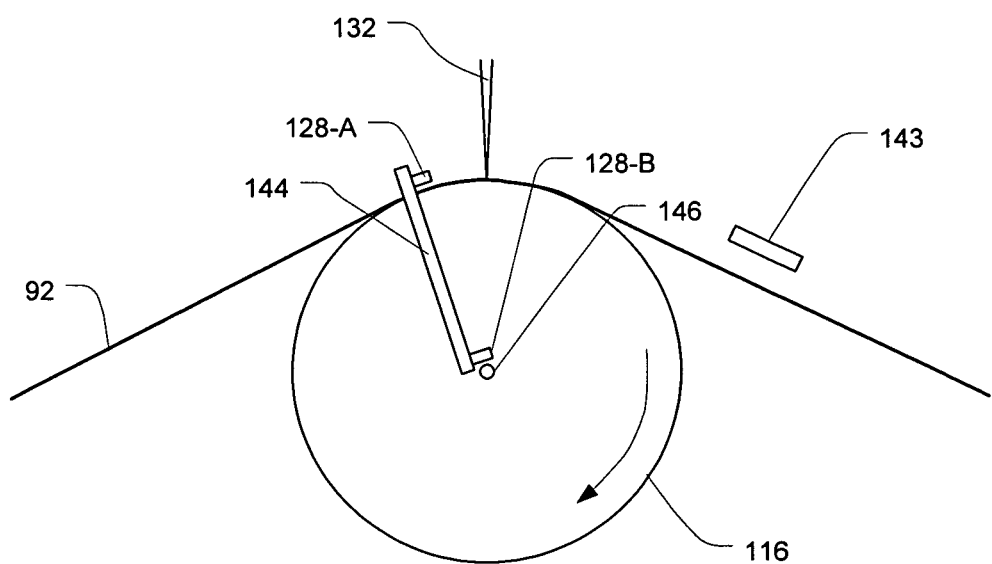
FIG. 26 is a close-up view of a write spindle portion of the system of FIG. 25.

FIG. 26 shows a closer view of the area of the write spindle drum 116. A pair of radius sensors 128-A and 128-B are secured to a rigid support member 144, with the first radius sensor 128-A disposed directly opposite the tape 92 lying on the surface of the drum 116, and the second radius sensor 128-B disposed at an axle 146 of the drum 116. The radius sensors 128 may measure a radius that includes the radius of the write spindle 98 combined with a thickness of the tape 92, both of which may vary during operation. The center of rotation is the center of the air bearing 120 (FIG. 22), which is relatively stable.

A beneficial feature of the disclosed tape transport subsystem is the absence of mechanical contact with the tape 92 other than contact with the three spindles 96, 98 and 100. Any mechanical contact can create variations in friction that may be hard to control. Friction due to mechanical contact is particularly troublesome due to a tendency to exhibit stick-slip motion and high temporal frequency error terms. For best performance, it is desirable to eliminate high-frequency spatial or temporal error sources, and exert closed loop control over the remaining low frequency sources.

One purpose of the write spindle 98 is to provide a large thermal mass and corresponding large heat dissipation area for transfer of the thermal energy of the writing process to the environment with a time constant that is very long. Since the laser writing process imparts heat into the tape 92, contact between the tape 92 (which may be stainless steel, nickel alloy, or other similar material) and the write spindle 98 (which may be stainless steel or another material having suitable strength and thermal characteristics) is necessary to maximize heat absorption with minimal change in temperature. The thermal capacity of the tape 92 itself may be insignificant compared to the thermal capacity of the write spindle 98. Furthermore, the circumferential face of the write spindle 98 provides a much larger surface, compared to the tape 92, across which heat can be dissipated to the environment with minimal change in temperature.

The limits of writing accuracy, and therefore the scale pitch, are generally dependent on the reduction of elimination of static and dynamic errors, particularly in systems requiring arc-second long term stability/accuracy. There are at least three significant sources of radius errors: thermal expansion, eccentric mounting, and spindle encoder errors. The first contribution, thermal expansion, is limited by the large thermal mass of the spindle. Therefore, the spindle can only change slowly. As shown below, further error reduction may be achieved with differential measurement of the spindle radius with an improved radius sensor, closed loop pitch control with one or more radius sensors, or with other suitable measurement methods.

A second error contribution, eccentric mounting of the write spindle 98 relative to the axis of rotation, will lead to a once-per-revolution (first harmonic) error. This error is reducible with processing using closed-loop pitch sensors, a differential measurement of the spindle radius, closed loop pitch control, or other suitable measurement methods. For instance, measuring a few samples of tape off-line and entering first harmonic correction coefficients into the spindle controller could also remove it.

A third error contribution, that of the encoder 126, is to be considered. Angular errors of the write spindle 98 (when multiplied by the write spindle radius) become linear errors in the tape 92. At a nominal spindle radius of 0.1 meters, for example, an angular error of 1 arc second translates to a linear error of 0.48 μM on the tape. A state-of-the art precision encoder may reduce the errors to an acceptable level. However, since it is generally difficult and expensive to make an angular encoder that provides sub-microradian precision in all environments, the write spindle 98 may incorporate self-calibration of the spindle encoder using multiple read heads 126, 127. One signal processing algorithm may simply average the measurements from the read heads. Alternatively, the signals from two read heads may be continuously compared and an error function derived from a Fourier analysis of the difference. The Fourier data describes the amplitude and frequency of repetitive errors such that they may be anticipated and corrected. This process may be also be implemented for "on-line", continuous operation.

It may be desirable, before any tape 92 is processed, to rotate the write spindle 98 through many revolutions while the encoder 126 provides data from which the real-time controller 102 adaptively learns the correction function for the write spindle 98. The controller 102 may carry out this operation with an embedded processor, or in combination with the host computer 104. The error is a function of the encoder disk 124 and its mounting to the air-bearing spindle 120, both of which remain nearly constant. As such, after a few rotations, the write spindle encoder error can be removed.

The write spindle 98 may also be corrected by first writing a few samples of tape. The resulting pitch error is then measured, and preferably averaged over the sample set or otherwise processed to obtain high confidence in the estimate. A resulting correction function, which may include scale factors and offsets, is then stored in the controller 102 and used to adjust the control signals provided to the write spindle 98 and/or other functional components. In any case, the self-calibration is simply a convenient way to calibrate with the advantage that it is continuously correcting errors.

It will be appreciated that there is a relationship between the thickness variations of the tape 92 and the radius of the write spindle drum 116 on the one hand, and deviations in the pitch of the metrological scale 112 on the other hand. By way of example, a 1 μm error in thickness produces 2 πμm of error per spindle revolution. If the radius of the spindle corresponds to two revolutions per meter, the resulting error is about 12 μm per meter (12 μm/m), which is somewhat larger than the desirable goal of not more than 10 μm/m. It will also be appreciated that instability of the radius sensor 128 may also translate into a linear error in the laser position on the tape.

In one embodiment a high stability radius sensor can be constructed as shown in FIG. 26. A small diameter pin 146 (e.g., 3 mm in diameter) is set in the center of the write spindle drum 116. Two capacitive sensors 128-A and 128-B are mounted on a thermally stable bar 104 (for example Invar) so as to read both the radius of the tape 92 on the write drum 116 and the radius of the pin 146. After a few revolutions of the drum 116 in calibration mode, the repeatable runout errors can be identified and calibrated out of the sensor signals with relation to the write spindle rotary encoder. These sensors have a linear resolution in of 2 nm RMS or better and thus may offer 4 nm/100 mm or 0.04 PPM radius error resolving power. These sensors are thus capable of accurately compensating for radius error to fractions of micron per meter.

In some embodiments, the sensors 106 of FIG. 25 may be operated only for calibration prior to writing. Alternatively, the output may be sampled infrequently during writing, or at a rate comparable to the writing rate. Similarly, other probes (for instance temperature sensors attached to a spindle) may be periodically sampled. However, it is preferred that the data from at least the radius sensors 128 be utilized during writing to monitor any thermal expansion of the spindle or other thickness variations. In a preferred embodiment the radius sensors 128 provide for correction of instantaneous (relatively high frequency) variations and slow (e.g.: DC or low frequency) variations during the time frame at which the tape scale is fabricated.

The high stability radius sensors 128 are adapted to track and correct both low and high frequency pitch variations, but further error reduction or may be achieved with the use of one or more downstream sensors 143. For instance, these sensors may be optical encoders, and used to obtain data "off-line" and to identify and establish correlation with various system error sources. In one embodiment two probes may be located at 15 and 30 degrees respectively from the laser writing position. One signal processing algorithm may simply average the measurements from the two probes. Alternatively, the signals from the two probes may be continuously compared and an error function derived from a Fourier analysis of the difference. The Fourier data will describe the amplitude and frequency of repetitive errors such that they may be anticipated and corrected. This process may be implemented "on-line" to run continuously, or sampled at intervals.

The optional probes may be pitch sensors placed circumferentially after the writing field on the periphery of the write spindle 98. The change in relative phase between the two sensors may be used as a measure of scale pitch. The scale of the writing process is controlled by altering the effective radius of the spindle in response to variations in the phase relationship between the pitch sensors. The pitch sensors may be used to correct errors that occur at low spatial and temporal frequencies. Any thermal growth of the spindle (say due to a startup transient as the spindle comes up to operating temperature when first turned on), will be corrected by the pitch sensors. The large thermal mass of the write spindle 98 ensures that the rate of change of spindle radius is slow and therefore well within the adaptive bandwidth of a pitch control algorithm. Any eccentricity in the spindle mounting which is unobservable to the spindle encoder (which has its own mounting error with respect to the axis of rotation) will lead to a first harmonic error in the tape. The pitch sensors are able to correct for spatial frequencies at the first and second harmonic.

FIGS. 27-31 illustrate, in progressive detail, a control system corresponding to an embodiment of the present invention.

Figure 27:
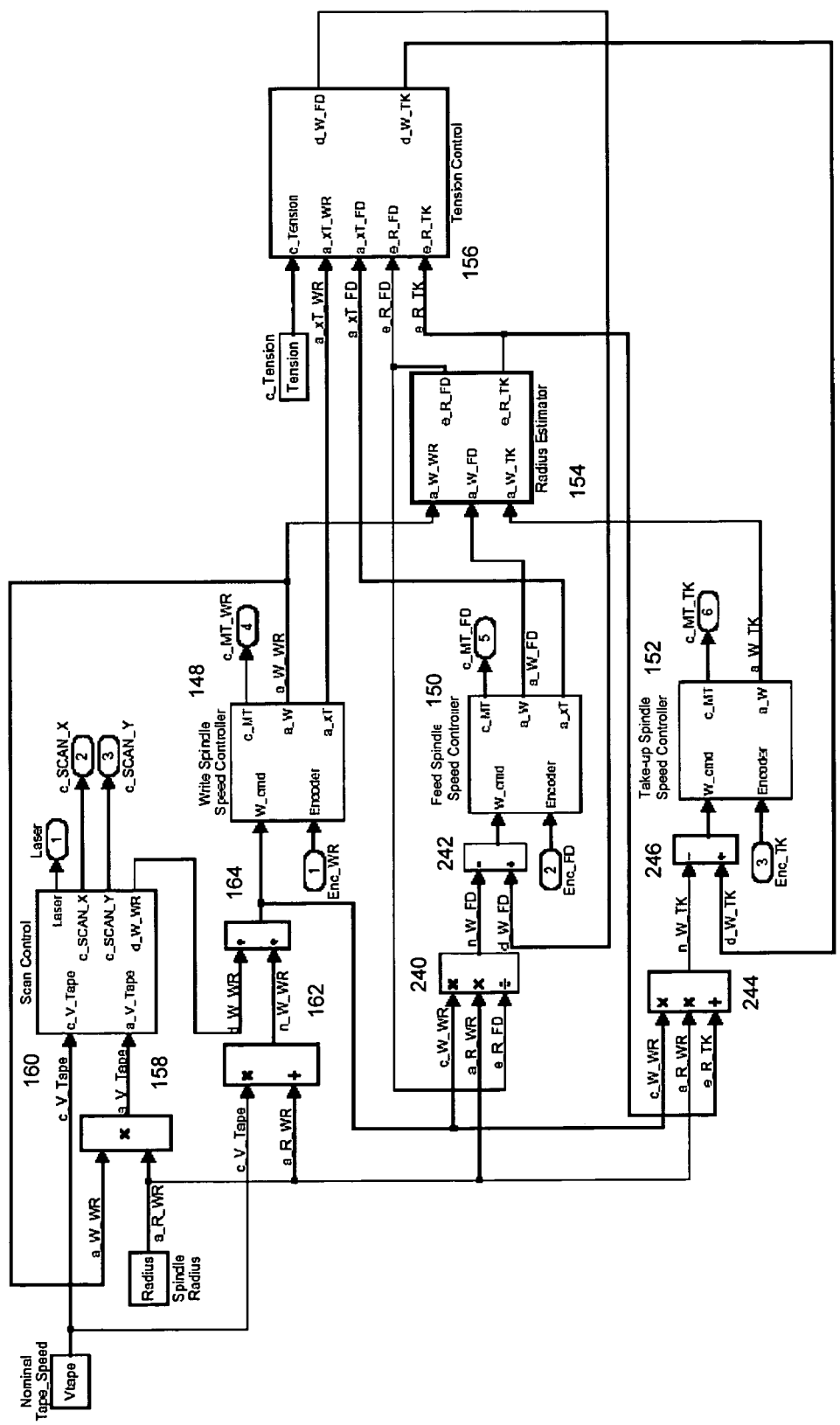
FIG. 27 is block diagram showing the overall structure and function of the real-time controller of FIG. 25.

FIG. 27 is a schematic showing pertinent components within the beam box controller 108 and the material handling controller 102 of FIG. 25. A write spindle speed controller 148, feed spindle speed controller 150, and take-up spindle speed controller 152 control the operation of the write, feed, and take-up spindles 98, 96 and 100 respectively. Also shown are a radius estimator 154, a tension controller 156 and a scan controller 160. The functions of these components are described below. Many functions are performed in parallel. The architecture can generally be regarded as a multi-loop control system, with an outer level corresponding to FIG. 27 and respective inner levels (described below) involving each controller 148, 150 and 152. The outermost control loop, shown in FIG. 27, is responsible for synchronizing the movement of the tape by the three spindles 96, 98 and 100 with the scanning and pulsing of the laser beam to place the marks 114 on the tape 92 in the desired locations. The function of the outermost control loop is explained first, followed by a description of the inner control loops.

The following table presents a glossary of terminology used in the description below.

|  | Physical Units | Write | Feed | Take-up |
|---|---|---|---|---|
| Angular Velocity | radian/sec | | | |
| Measured (actual) | | a_W_WR | a_W_FD | a_W_TK |
| Command | | c_W_WR | c_W_FD | c_W_TK |
| Nominal | | n_W_WR | n_W_FD | n_W_TK |
| Correction (delta) | | d_W_WR | d_W_FD | d_W_TK |
| Encoder Output | Radians | | | |
| Measured | | enc_WR | enc_FD | enc_TK |
| External Torque | Newton-Meter | | | |
| Measured | | a_xT_WR | a_xT_FD | a_xT_TK |
| Tape Linear Velocity | Meter/sec | | | |
| Command | | c_V_Tape | | |
| Measured | | a_V_Tape | | |
| Tape Position Error | Meters | | | |
| Measured | | err_P_Tape | | |
| Radius | Meters | | | |
| Known | | a_R_WR | | |
| Estimated | | | e_R_FD | e_R_TK |
| Tape Tension | Newton | | | |
| Command | | c_Tension | | |
| Estimated | | | | |
| Motor Drive (Torque) | Newton-Meter | | | |
| Command | | c_MT_WR | c_MT_FD | c_MT_TK |
|  |  | X | Y |  |
| Beam Scan | Meter | | | |
| Command | | c_SCAN_X | c_SCAN_Y | |
| Average Position (mean) | | mn_SCAN_X | | |

As an additional aid in the description, a sign convention is established to reflect the direction of rotation of the spindles 96, 98 and 100. From the perspective shown in FIG. 19, clockwise rotation is taken as positive. Thus during normal (forward) operation, the write spindle 98 has positive angular velocity, whereas both the feed spindle 96 and take-up spindle 100 have negative angular velocity.

The overall progress of tape through the system is based on a desired nominal tape speed. A commanded linear velocity c_V_Tape is determined by the spacing of the marks 114 (e.g., 20 μm) along with the time required to form one mark 114 and advance the laser spot to the start of the next mark 114. The actual tape velocity a_V_Tape may differ slightly from the desired nominal velocity due to various causes (friction, torque ripple in the motors, etc). The actual tape velocity is determined from the product 158 of actual angular velocity of the write spindle a_W_WR and the radius of the write spindle a_R_WR.

The Scan Controller 160 is responsible for placing the marks at the desired location on the tape despite variations in actual tape velocity. In addition, the Scan Controller 160 provides a correction signal d_W_WR to the angular velocity command of the write spindle 98. The velocity correction maintains the average X position of the spot centered in the writing field of the scan system. The nominal tape velocity c_V_Tape is converted into a nominal angular velocity command to the write spindle n_W_WR by dividing by the radius of the write spindle 98 in multiplier 162. The angular velocity command to the write spindle c_W_WR is calculated in summer 164 by adding the velocity correction d_W_WR from the Scan Controller 160 to the nominal angular velocity n_W_WR calculated in multiplier 162.

The write spindle speed controller 148 is responsible for maintaining the desired write spindle speed based on the angular velocity command to the write spindle c_W_WR. The write spindle speed controller 148 produces a signal c_MT_WR that is a torque command for the write spindle servo motor. Furthermore, the write spindle speed controller 148 produces two signals based on measurements derived from the write spindle encoder. Signal a_W_WR is the actual angular velocity of the write spindle, and signal a_xT_WR is the actual external torque that is applied to the write spindle (due to unbalanced tension in the two tape segments, one between the feed spindle 96 and the write spindle 98, and the other being between the write spindle 98 and the take-up spindle 100).

Feed spindle speed controller 150 and take-up spindle speed controller 152 are both identical to the write spindle speed controller 148, although the overall control of the feed spindle 96 and take-up spindle 100 differs from that of the write spindle 98 due to differences in the overall control loops as described below. Where the speed of the write spindle 98 is controlled to obtain a desired tape velocity, the respective speeds of the feed spindle 96 and take-up spindle 100 are controlled to obtain desired tape tension as described in more detail below.

The angular velocity command input to the feed spindle speed controller 150 is formed from the sum of a nominal angular velocity n_W_FD and a correction angular velocity d_W_FD in summer block 242. Multiplier 240 forms the nominal angular velocity for the feed spindle n_W_FD based on the commanded angular velocity of the write spindle c_W_WR multiplied by the radius of the write spindle a_R_WR and divided by the radius of the feed spindle e_R_FD. The correction term d_W_FD for the feed spindle controller 150 is computed in the tension controller 156 (described below). Recall that the nominal angular velocities of the feed and take-up spindles 96, 20 are both negative when the tape velocity is positive. The negative sign in the summer block 242 (and summer block 246 for the take-up spindle 20) reflects this inversion of the nominal angular velocity command. The same form of calculation is performed for the take-up spindle command signal c_W_TK by summing in block 246 the nominal angular velocity n_W_TK computed in multiplier 244 with a correction term d_W_TK computed in the tension controller 156.

Figure 28:
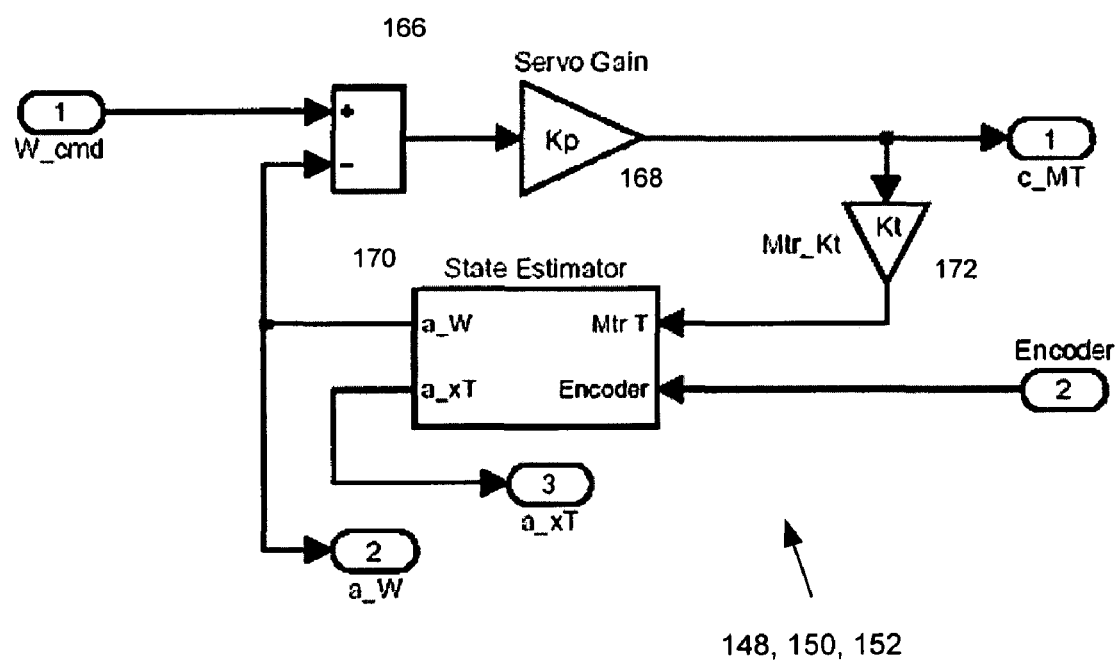
FIG. 28 is a block diagram of a spindle speed controller utilized in the real-time controller of FIG. 27.

FIG. 28 shows the structure of the write, feed and take-up spindle speed controllers 148, 150 and 152. The angular velocity command signal W_cmd is summed in summer 166 with an actual angular velocity a_W, which is generated by a state estimator 170. The velocity error from the summer 166 is multiplied by a gain Kp in gain block 168 to form a command signal for the respective motor. The state estimator 170 receives the known motor command signal (converted to units of torque by gain block 172 with the known torque constant of the motor Kt) and the position signal Encoder from the spindle encoder. It is a generally known use of state estimators to estimate the underlying states of a physical system based on a physical model of the system as well as known and unknown inputs and available measurements. In the spindle controllers 148, 150 and 152, the state estimator 170 computes the spindle angular velocity a_W and an estimate of the external torque a_xT applied to the respective spindle. The external torque signal for the take-up spindle 100 (generated by take-up spindle controller 152) is not used in the overall control system shown in FIG. 27, and therefore is not shown in FIG. 27.

The state estimator 170 may be implemented as a classic three-state estimator in a discrete-time manner. Well known examples can be found in "Digital Control of Dynamic Systems" by Franklin, Powell and Workman, which is also referenced in U.S. Pat. No. 5,469,414 at column 14, line 56. The three states estimated by the estimator are: position, velocity and external (disturbance) torque. The known input to the plant (spindle motor) is c_MT, and the "measurement" is the actual position of the spindle as measured by the encoder. The form of the controller is substantially as described in Chapter 8 and shown explicitly in FIG. 8.6 of Franklin, Powell and Workman. It should be noted that Franklin and Powell is a digital (discrete-time) control textbook, and the real-time controller 102 may indeed be implemented in a discrete-time fashion. For ease of explanation, however, the present description presents a continuous-time model of the real-time controller 102 (e.g. using continuous-time integrators rather than the digital or discrete-time equivalent). The transformation from continuous-time to discrete-time representations is part of the art well known to practitioners in the field.

Figure 29:
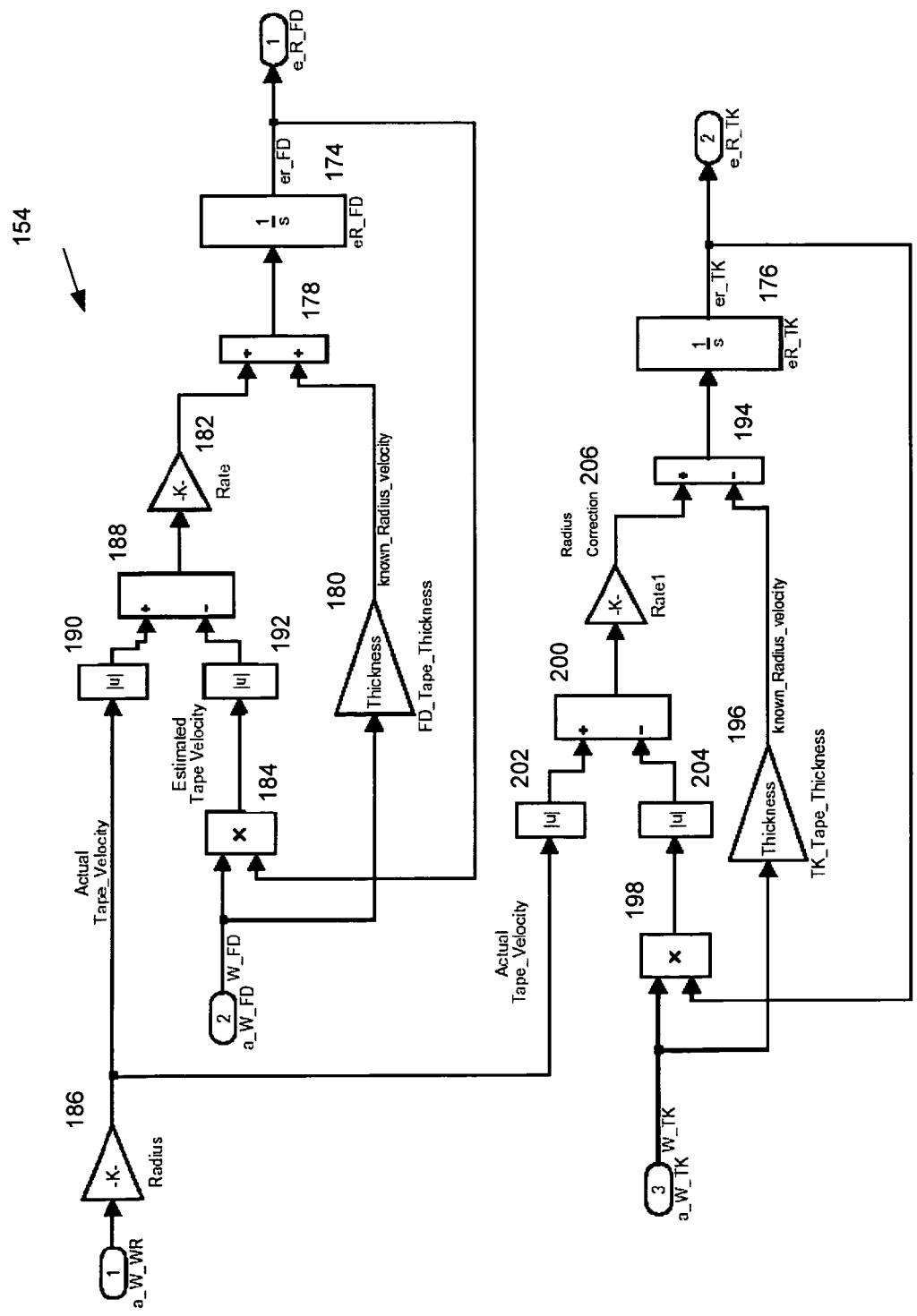
FIG. 29 is a schematic diagram of a radius estimator in the real-time controller of FIG. 27.

FIG. 29 depicts the radius estimator 154. The radius of the write spindle 98 is known with high precision due to the use of the radius sensors 128. The respective radii of the feed and take-up spindles 96 and 100 are not generally known to high precision, and they vary continuously as tape unwinds from the feed spindle 96 and onto the take-up spindle 100. The radii of the feed and take-up spindles 96, 100 is estimated by noting that the actual tape velocity must be the same at all three spindles under the assumptions that there is no slip between the tape and the spindles and that there is no slack in the tape 92.

The estimated feed spindle radius e_R_FD is calculated by integrator 174. The input to integrator 174 is the sum 178 of two sources. Assuming (for the moment) that the feed spindle radius were known at the start of tape motion, then the radius could be corrected at any future instant by integrating the radius velocity (rate of change of the radius) based on known tape thickness. This known correction to spindle radius is formed by multiplying the actual angular velocity of the FD spindle a_W_FD by (tape thickness/2n) in gain block 180. The result is the rate of change of radius. Integrating this rate in integrator 174 ensures that the estimated feed spindle radius remains correct despite the unwrapping of tape from the spindle. Note in FIG. 19 the direction of wrap of the tape on the feed spindle 96. Clockwise (positive) rotation of the feed spindle causes tape to be wound onto the spindle increasing the spindle radius. This results in a positive sign applied to the "known_Radius_velocity" signal at summer 178 for the feed spindle. Note also that during normal operation, the feed spindle rotates counterclockwise (a_W_FD is negative) and therefore the known_Radius_velocity is a negative number for the feed spindle causing the estimated feed radius to decrease with time.

If it were possible to know the feed spindle radius with high precision prior to processing, then the calculation described above would be sufficient to maintain an accurate estimate of feed spindle radius. In the illustrated embodiment, it is not necessary to obtain such an estimate. The radius estimator 154 corrects the estimated radius based on the apparent error between known tape velocity at the write spindle 98 and the tape velocity at the feed spindle 96, which is derived from the estimated radius and known angular velocity of the feed spindle 96. Gain block 186 multiplies the actual write spindle angular velocity a_W_WR by the known radius of the write spindle resulting in the actual tape velocity. Multiplier 184 produces the estimated tape velocity derived from the angular velocity of the feed spindle a_W_FD and the estimated radius of the feed spindle e_R_FD. Summer 188 forms the error in speed based on the absolute value of known tape velocity (190) and estimated tape velocity (192). Rate block 182 sets the rate of convergence of the speed difference. Note that if the output of summer 188 is positive (implying that the actual tape speed is larger than the estimated tape speed), then the estimated feed radius will increase until such time that the output of summer 188 becomes zero (estimated and actual speeds are equal). In practice, the estimated radius converges to the correct radius within a few millimeters of tape motion.

The radius estimation described above for the feed spindle 96 is duplicated for the take-up spindle 100. Integrator 176 is responsible for integrating the known radius velocity based on tape thickness and the radius correction based on apparent tape speed error. Note the minus sign on the known radius velocity term at summer 194. As the take-up spindle 100 rotates in the clockwise (positive) direction, tape unwinds from the spindle. In normal operation the angular velocity of the take-up spindle a_W_TK is negative and therefore the estimated take-up radius e_R_TK increases with time. Multiplier 198 forms estimated tape velocity based on estimated take-up spindle radius. Absolute value blocks 202 and 204, summer 200 and gain block 206 are similar to the corresponding elements for the feed spindle 96 as described above.

Figure 30:
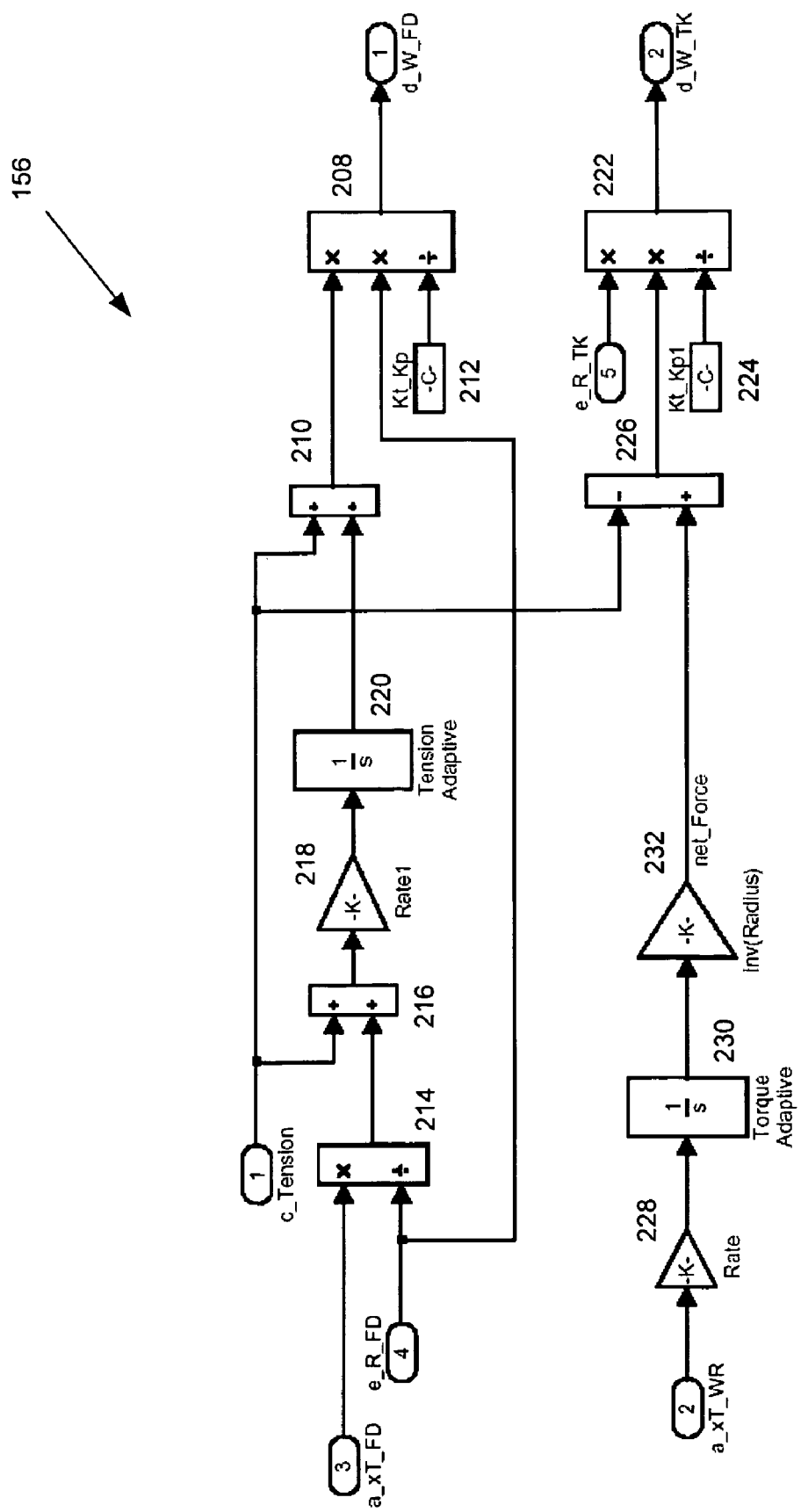
FIG. 30 is a schematic diagram of a tension controller in the real-time controller of FIG. 27.

FIG. 30 depicts the tension controller 156, which is responsible for producing correction signals d_W_FD and d_W_TK that modify the nominal angular velocity commands to the feed spindle speed controller 150 and take-up spindle speed controller 152. The feed correction signal d_W_FD is responsible for maintaining constant tension in the tape segment between the feed and write spindles 96, 98. The correction d_W_TK for the take-up spindle 100 is indirectly responsible for achieving the same tension in the tape segment between the write and take-up spindles 98, 100. The two most important objectives in the tension portion of the material handler controller 102 are (1) constant tension in the tape 92 prior to the writing zone, and (2) no slip between the tape 92 and the write spindle 98. The "no-slip" criterion is due to the requirement that tape position be inferred from angular motion of the write spindle 98, which is ultimately derived from the write spindle encoder. If the tape slipped with respect to the write spindle 98, then spindle position information would not be sufficient to determine tape position. Tape slip is avoided by ensuring that there is never any external torque on the write spindle 98 during tape transport. Because the segment of tape leading from the feed spindle 96 to the write spindle 98 and the segment from the write spindle 98 to the take-up spindle 100 act at the same radius with respect to the write spindle 98, the "no external torque" condition is satisfied when the tensions in the two tape segments are equal.

Tension in the feed segment (that segment of tape 92 between the feed and write spindles 96, 98) is controlled by modifying the velocity command to the feed spindle speed controller 150. Referring to FIG. 30, the modified feed angular velocity command is the sum 210 of two signals. Since the speed controllers are proportional controllers, if the actual angular velocity and nominal angular velocity are equal, then no motor torque is produced. A speed difference must exist in the speed controller in order to produce motor torque. The amount of torque produced is proportional to the velocity error times the servo gain Kp and the motor torque constant Kt. In order to produce tension in the tape segment of 1 Newton, for instance, the feed servo motor will need to produce a torque of 1N times the feed radius e_R_FD. Thus a velocity error of 1N*e_R_FD/(Kt*Kp) radian/sec is required to produce that torque.

The c_Tension signal in FIG. 30 in conjunction with multiplier 208 produces a correction to the nominal angular velocity command designed to achieve the desired tension. The external torque signal a_xT_FD from the state estimator 170 in feed speed controller 152 (FIG. 28) divided by the estimated feed radius e_R_FD in multiplier 214 should be equal in magnitude to the desired tension. Note that normal tape tension results in a negative external torque (counterclockwise is negative) applied to the feed spindle 96. When the tape is properly tensioned, the output of multiplier 214 is equal in magnitude but opposite in sign to the desired tape tension. If the actual tape tension is lower in magnitude than the desired tension, the output of summer 216 will be positive. The positive error in force will be multiplied by the adaptive rate block 218 and integrated by the tension adaptive integrator 220. The adaptive correction (in units of force) is added to the nominal tension command by summer 210 resulting in a further correction to the angular velocity command to the feed speed controller 150. The positive error at summer 216 produces a positive velocity correction resulting in positive motor torque (clockwise torque) at the feed spindle 96. This provides more tension in the tape, thereby increasing the external torque a_xT_FD signal. When the actual external torque is equal in magnitude (but opposite in sign) to c_Tension, the output of summer 216 is zero and the tension adaptive integrator 220 holds the required force adjustment that maintains the proper tension.

It would be possible to implement a similar controller for maintaining tension in the take-up spindle 100, and further to set the tension objective to the same value to maintain equal tension in the two tape segments. However, note that the tension adjustment used for the feed spindle 96 depends upon the estimated radius of the feed spindle. There will always be some uncertainty in the radius estimate. Thus a similar approach for controlling tension in the take-up tape segment would also involve errors resulting from the estimated take-up spindle radius. Thus, in the presently disclosed embodiment the tension in the take-up segment is controlled directly as a function of external torque on the write spindle 98, so as to maintain the external torque at substantially zero.

Summer block 226 in FIG. 30 sums the nominal tape tension c_Tension with a correction based on the integral of external torque applied to the write spindle a_xT_WR. The external torque on the write spindle 98 is multiplied by an adaptive rate (gain block 228), integrated in block 230 and converted to units of force by block 232 (torque/radius=force). The sign of the adaptive contribution to summer 226 is selected such that if there exists a positive external torque on the write spindle 98 (a_xT_WR is positive), then the velocity command to the take-up spindle 100 is increased until a_xT_WR becomes zero. Note that the take-up spindle 100 rotates in the negative direction during normal tape operation. The nominal tension in the tape 92 is achieved by commanding the take-up spindle 100 to rotate slightly faster in the negative direction (note the minus sign applied to nominal tension at summer 226) than would be necessary based on nominal tape speed. A positive correction to the negative bias will reduce the tension in the tape segment between the write and take-up spindles 98, 100. This reduces the tension on the positive side of the write spindle 98 and thereby restore the positive a_xT_WR signal to the desired value of zero. The actual tension in the take-up tape segment is necessarily equal to the tension in feed segment of the tape when the external torque on the write spindle 98 is zero.

Figure 31:
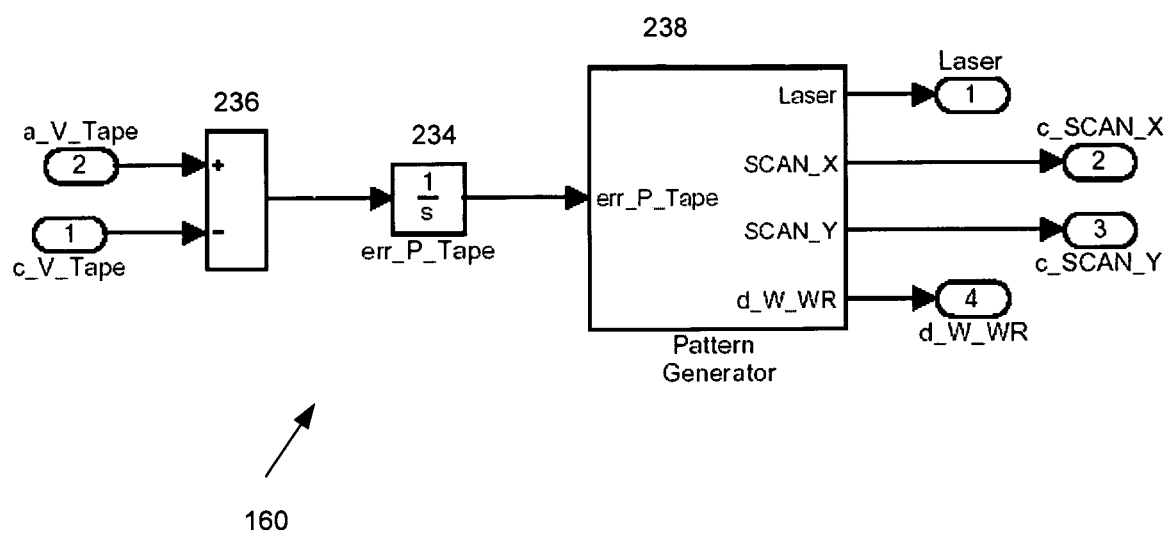
FIG. 31 is a schematic diagram of a scan controller in the real-time controller of FIG. 27.

FIG. 31 depicts the scan controller 160. The difference in velocity between the nominal tape speed and the actual tape speed is formed by summer 236 and integrated by integrator 234. The output of integrator 234 is the error in tape position accumulated since the start of tape motion. The pattern generator 238 is responsible for generating scan signals c_SCAN_X, c_SCAN_Y and the laser firing signal Laser based on the actual tape position error err_P_Tape from integrator 234 and the nominal mark pattern. If an error in tape position is positive, then the Pattern Generator 238 gradually increases the average c_SCAN_X value of the pattern in order to maintain the marks at the proper location on the tape. In the absence of any further correction, the c_SCAN_X value would eventually reach the physical limit of the marking field. Thus, a correction to the nominal tape velocity is also made by adjusting the angular velocity of the write spindle with signal d_W_WR. The pattern generator 238 produces signal d_W_WR based on the integral of the tape position error. The integral action ensures that marking is restored to the center of the marking field. The correction signal for the write spindle d_W_WR is summed with the nominal angular velocity in summing block 164 (FIG. 27). A system of the present invention may be utilized to produce a metrological scale having pitch accuracy of about 10 μm/meter or better, pitch of 10-50 μm nominal, having sufficient optical contrast sufficient for use with optical encoders.

Although in the above description a reflective optical scale 10/112 in particular is described, in will be apparent to those skilled in the art that the disclosed technique may be used to make other types of optical elements in the form of binary patterns or even "digital" lens structures to focus reflected light in a desired pattern. Such optical elements may include, for example, an index pattern such as shown in US Published Patent Application 20030047674. Also, the process disclosed herein is thermal in nature, and therefore almost any wavelength laser with proper energy and beam shape will work on metals such as Inconel and other nickel based alloys. IR lasers are believed to be the most practical today. However, other lasers such as green and ultraviolet (UV) lasers may be used. For other material types such as ceramics, UV lasers may be more suitable than IR lasers because they have better energy coupling into the substrate.

As indicated, the manufactured scale may form part of an optical encoder which may be utilized in a variety of motion control applications such as linear and rotary actuators, robot joint control, etc. An example of such encoders is the family of Mercury™ II encoders manufactured by MicroE Systems Inc., which are described for example in US Published Patent Application 2003/0047674 entitled "Reference Point Talbot Encoder". A metrology system including such an optical encoder includes (1) a source of radiant energy adapted to irradiate a plurality of the side by side marks, (2) an optical scale reader (optical detector) operative to receive, within a reader field of view, reflected radiant energy from the marks, at least a portion of the reflected radiant energy comprising a plurality of diffracted energy portions that produce a fringe pattern as a result of interference between the diffracted portions, the contrast of the fringes of the pattern being dependent on the optical contrast of the marks relative to the surrounding substrate, the contrast being measurable within the reader field of view; (3) a displacement mechanism operative to move the scale relative to the reader, (4) a signal processor operative to produce an output signal representative of the displacement based on a shift of the fringe, and (5) a system controller operative to accept the output signal and control the operation of the displacement mechanism in response to the output signal.

In encoders such as the Mercury encoders, it is important that the scale be very uniform and have clean marks so as to generate relatively noise-free optical signals and thereby enable the encoder to achieve high resolution. The presently disclosed scale and manufacturing technique provide such an advantage. Further, the optical emitter of the encoder generally irradiates a plurality of marks of the scale, thereby decreasing sensitivity of the encoder data to localized variations in reflectance, edge variations, and the like. As such, provided the contrast is sufficient, the precise optical properties of scales corresponding to embodiments of the present invention need not have stringent requirements and thus the scales can be manufactured at low cost. Also, in some cases the Mercury encoders rely on the presence of a reference mark and/or limit marks, and the present technique can be utilized to make these marks as well as a darkened area to reduce optical crosstalk with the main track.

It should be noted that the presently disclosed scale may also be used in traditional "geometric" optical encoders that utilize patterns of light shadows rather than interference patterns, such geometric encoders being of generally lower resolution than encoders of the Mercury type.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. A reflective scale for a diffractive optical encoder, comprising a metal substrate having a scale pattern formed on a reflective surface thereof, the scale pattern including a plurality of elongated side-by-side marks surrounded by reflective surface areas of the substrate, each mark having a generally furrowed cross section with a central region below a mean height of the surface of the substrate and two outer ridge regions above the mean height of the surface of the substrate, wherein the central and outer ridge regions define a mark depth being in the range of about 0.5 microns to about 2 microns, and wherein the central region of each mark is darkened to provide an optical reflection ratio with respect to the surrounding reflective surface areas of the substrate of about 1:4 or less.

2. A reflective scale according to claim 1, wherein each mark in its central region has a rippled texture with a ripple height less than about 20% of the mark depth.

3. A reflective scale according to claim 2, wherein each mark is rippled in its lengthwise direction.

4. A reflective scale according to claim 1, wherein the metal substrate consists essentially of a metal alloy.

5. A reflective scale according to claim 4, wherein the metal alloy is a nickel alloy.

6. A reflective scale according to claim 2, wherein the nickel alloy comprises about 60% nickel, about 20% chromium, about 5% iron, and about 10% molybdenum.

7. A reflective scale according to claim 1, wherein the marks have elongated side edges being straight to within about 10% of the width of the marks.

8. A reflective scale for a diffractive optical encoder, comprising a metal substrate having a scale pattern formed on a reflective surface thereof, the scale pattern including a plurality of elongated side-by-side marks surrounded by reflective surface areas of the substrate, each mark having a generally furrowed cross section with a central region below a mean height of the surface of the substrate and two outer ridge regions above the mean height of the surface of the substrate, the central and outer ridge regions defining a mark depth being in the range of about 0.5 microns to about 2 microns, each mark in its central region being rippled in the lengthwise direction with a ripple height less than about 20% of the mark depth, the central region of each mark being darkened to provide an optical reflection ratio with respect to the surrounding reflective surface areas of the substrate of about 1:4 or less.

9. A metrology system comprising:
the reflective scale of claim 1;
a source of radiant energy adapted to irradiate a plurality of the side by side marks of the reflective scale;
an optical scale reader operative to receive, within a reader field of view, reflected radiant energy from the marks, at least a portion of the reflected radiant energy comprising a plurality of diffracted energy portions that produce a fringe pattern as a result of interference between the diffracted portions, the contrast of the fringes of the pattern being dependent on the optical contrast of the marks relative to the surrounding substrate, the contrast being measurable within the reader field of view;
a displacement mechanism operative to move the scale relative to the reader;
a signal processor operative to produce an output signal representative of the displacement based on a shift of the fringes; and
a system controller operative to accept the output signal and control the operation of the displacement mechanism in response to the output signal.

10. An optical encoder comprising:
the reflective scale of claim 1;
a source of radiant energy adapted to irradiate a plurality of the side by side marks of the reflective scale;
an optical scale reader operative to receive, within a reader field of view, reflected radiant energy from the marks, at least a portion of the reflected radiant energy comprising a plurality of diffracted energy portions that produce a fringe pattern as a result of interference between the diffracted portions, the contrast of the fringes of the pattern being dependent on the optical contrast of the marks relative to the surrounding substrate, the contrast being measurable within the reader field of view; and
a signal processor operative to produce an output signal representative of relative movement between the scale and the reader based on a shift of the fringes.

* * * * *